Jan. 8, 1963  G. P. CHAN  3,072,238
PROGRAM UNIT
Filed Oct. 24, 1960  13 Sheets-Sheet 1
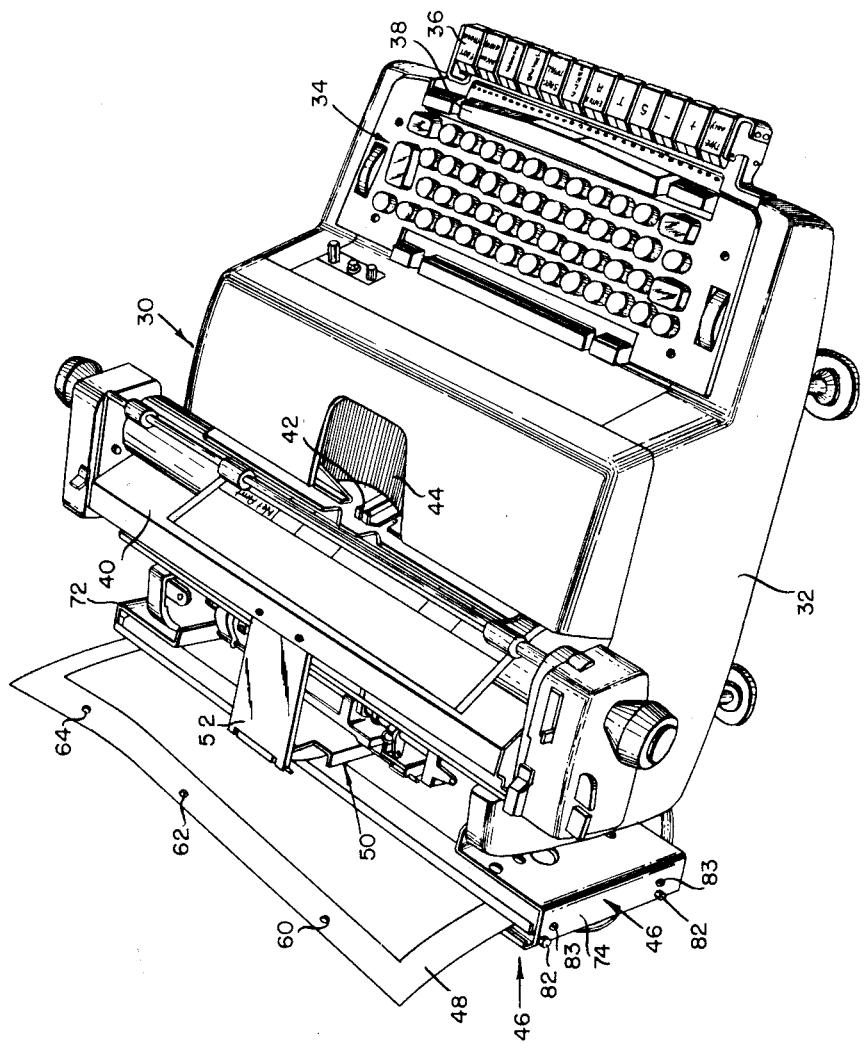
INVENTORS
Gim P. Chan
ATTORNEYS Jan. 8, 1963   G. P. CHAN   3,072,238
PROGRAM UNIT
Filed Oct. 24, 1960   13 Sheets-Sheet 2

*Fig. 2a*

INVENTOR.
Gim P. Chan
BY
ATTORNEYS

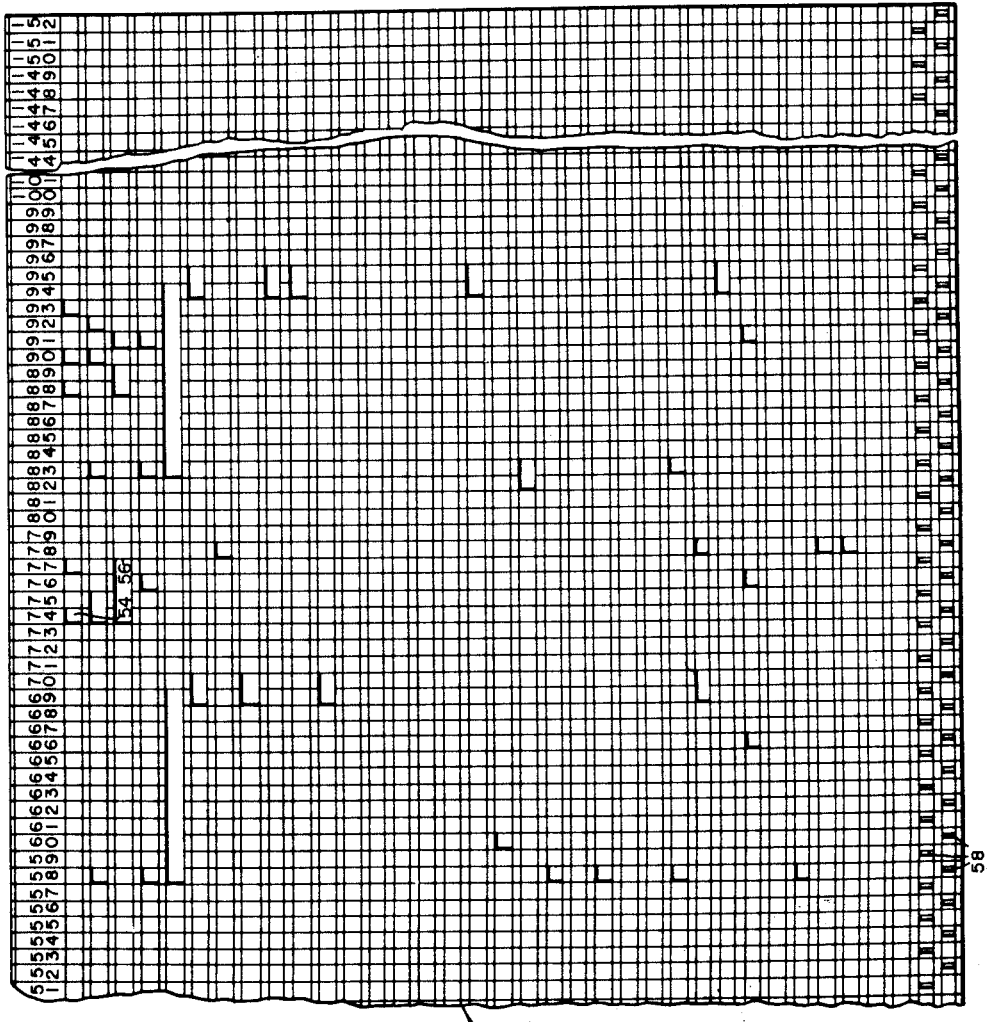

Jan. 8, 1963  G. P. CHAN  3,072,238
PROGRAM UNIT

Filed Oct. 24, 1960  13 Sheets-Sheet 4

INVENTOR
Gim P. Chan

Strauch, Nolan + Neale
ATTORNEYS

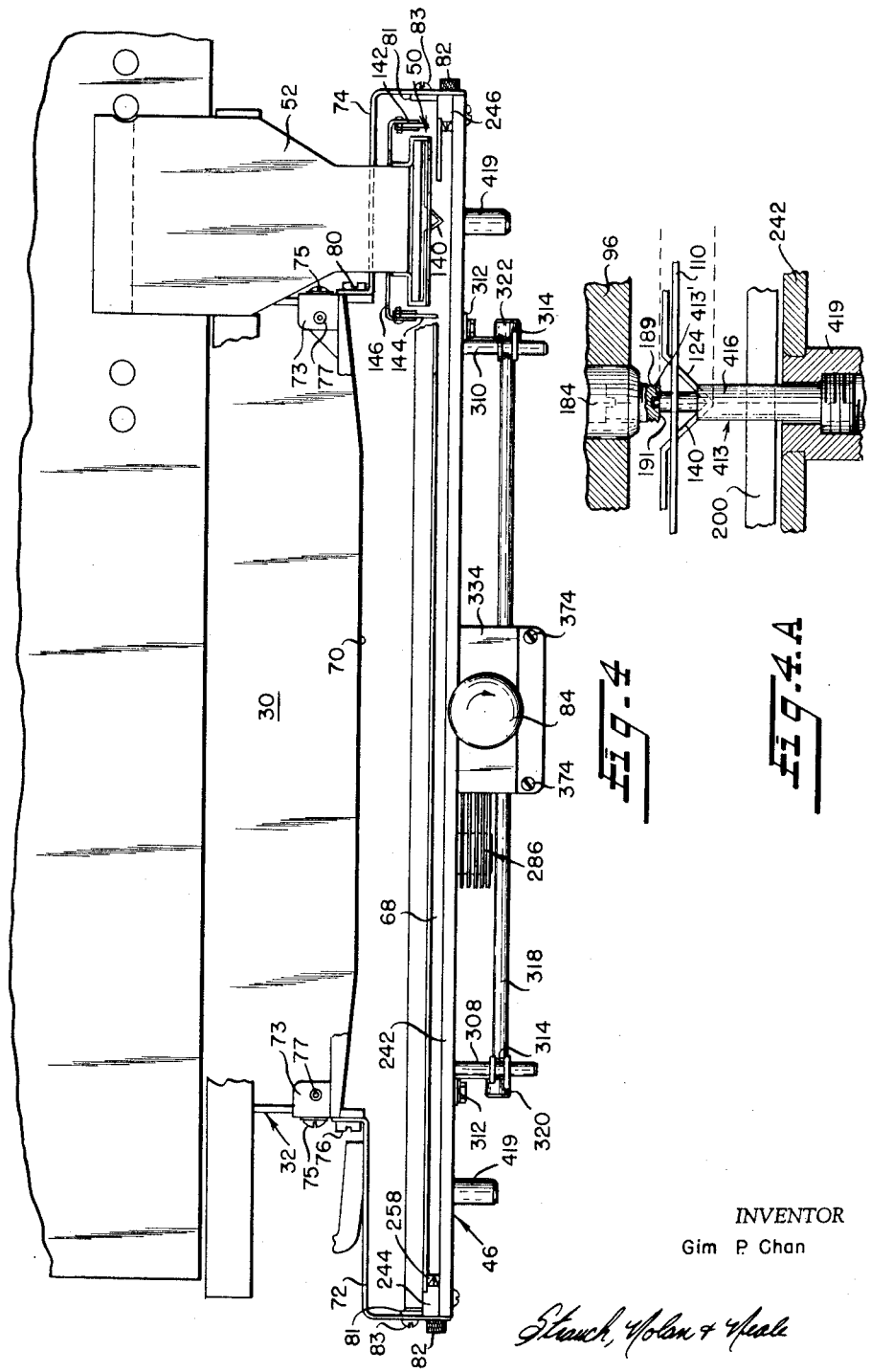

Jan. 8, 1963   G. P. CHAN   3,072,238
PROGRAM UNIT
Filed Oct. 24, 1960   13 Sheets-Sheet 6
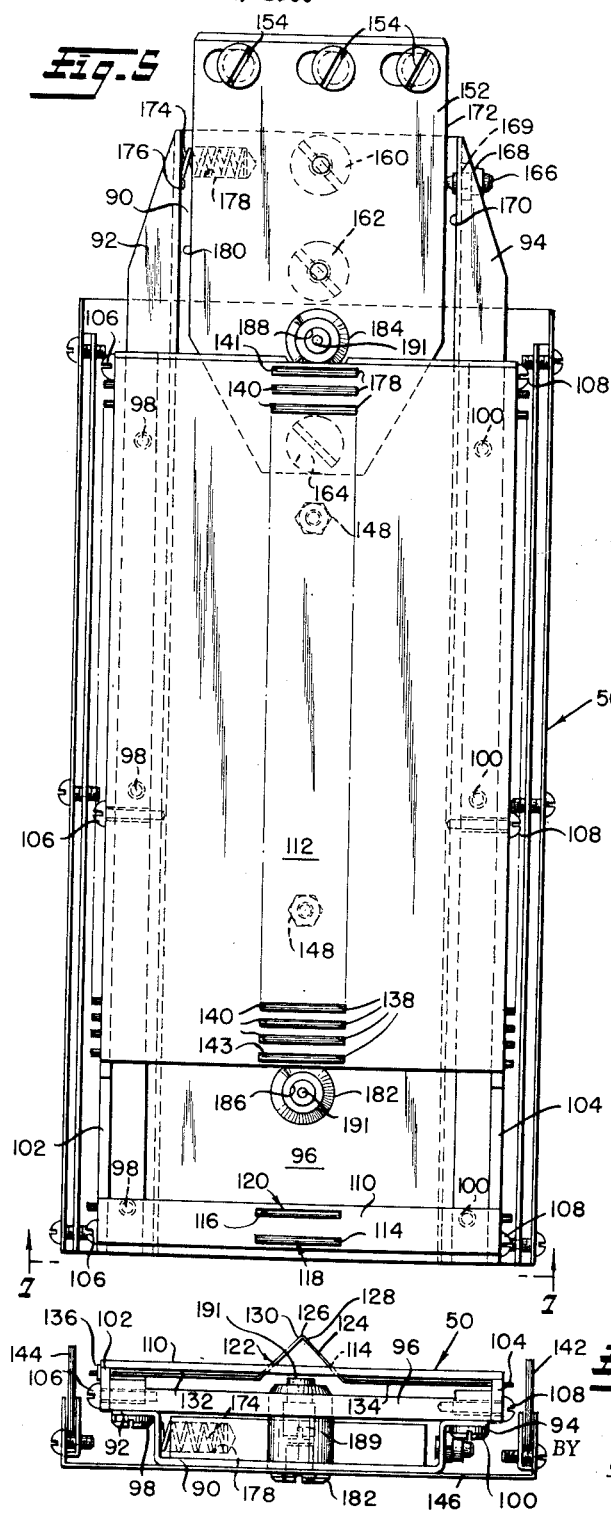
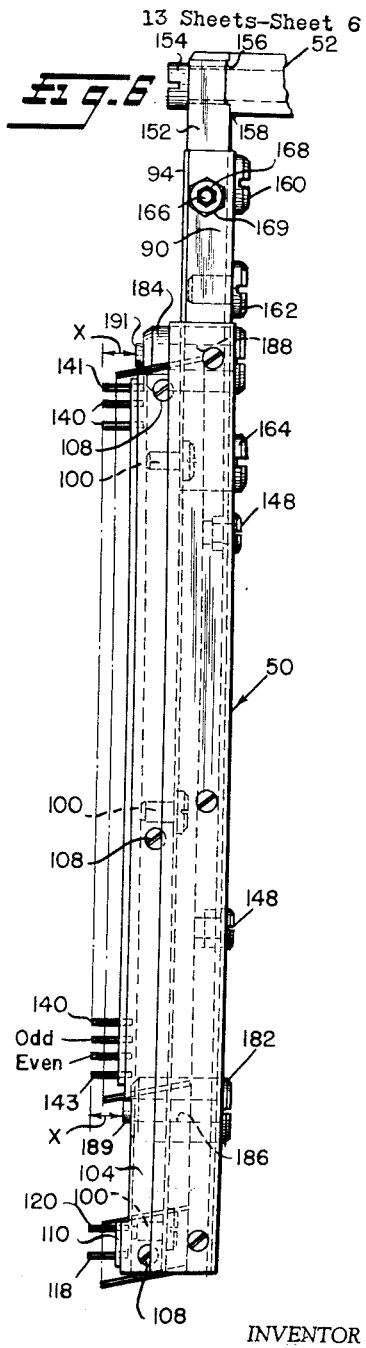
INVENTOR
Gim P. Chan
BY Strauch, Nolan & Neale
ATTORNEYS

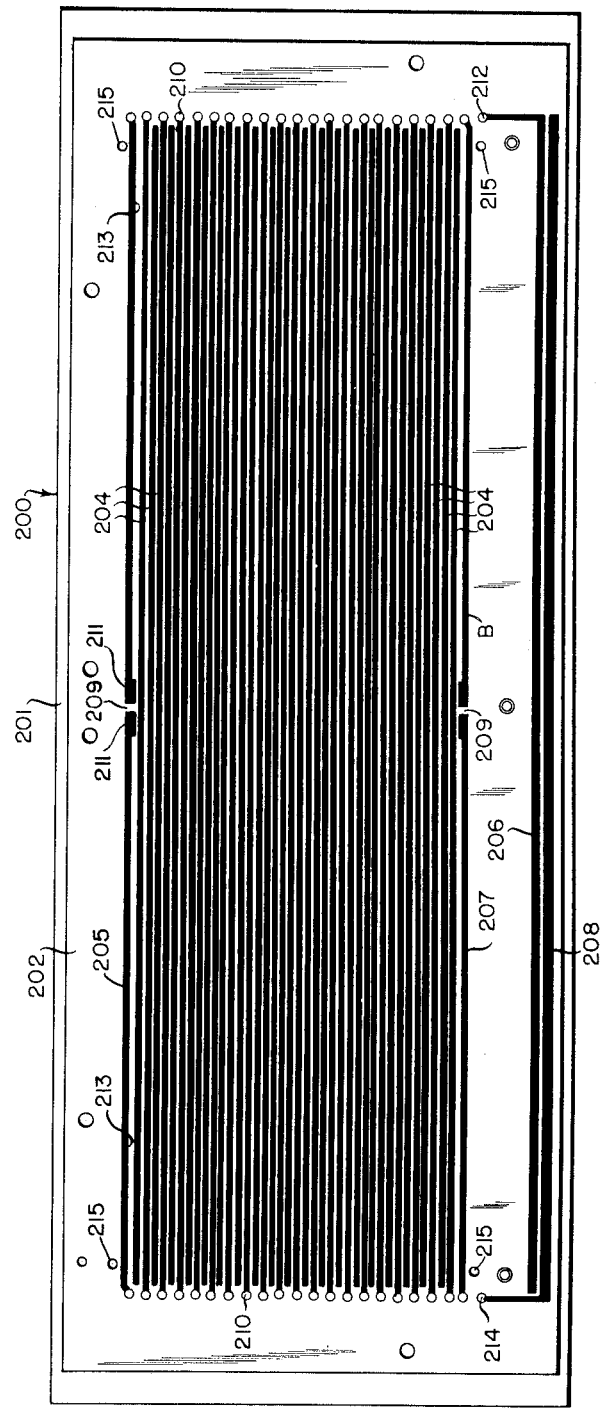

Jan. 8, 1963  G. P. CHAN  3,072,238
PROGRAM UNIT
Filed Oct. 24, 1960  13 Sheets-Sheet 8
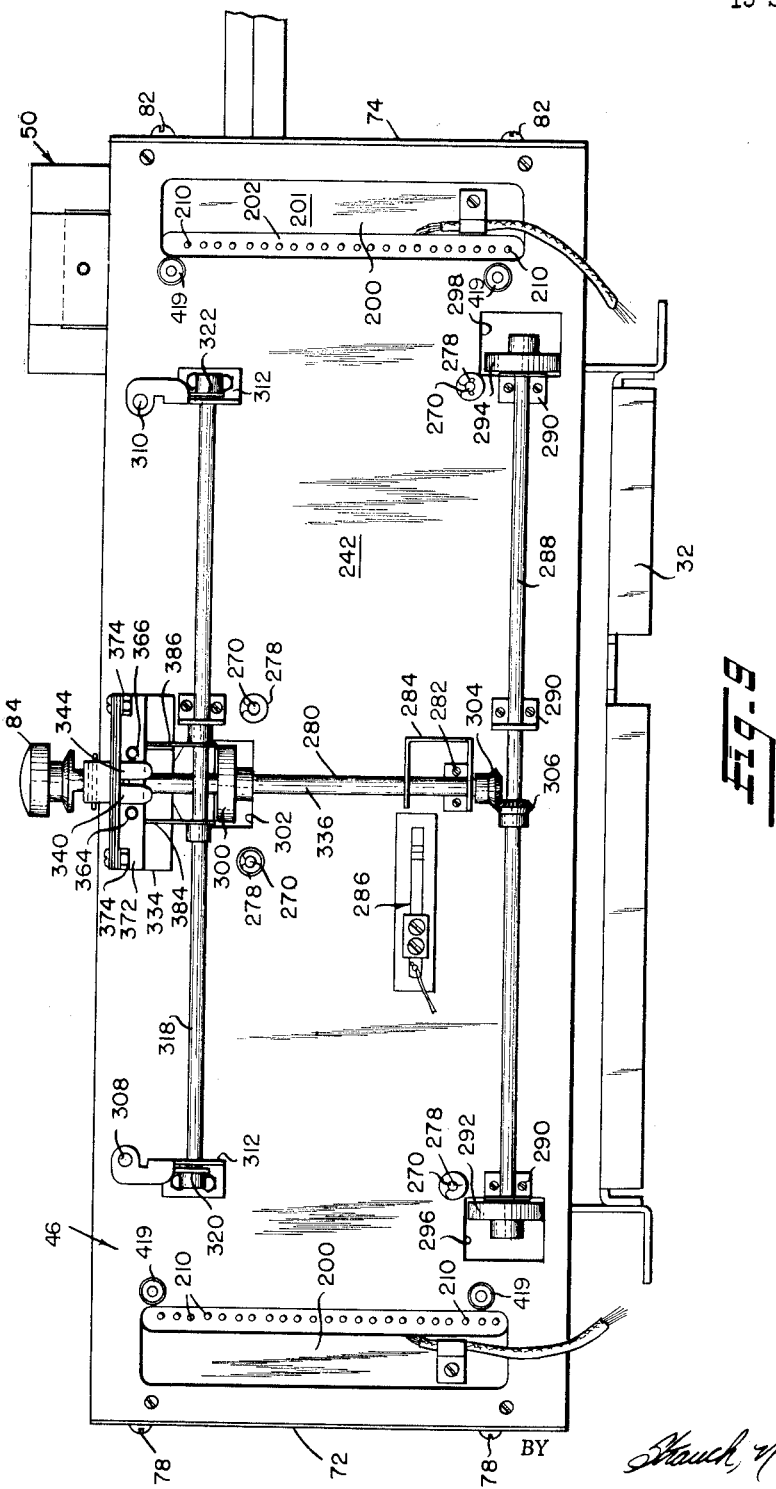
INVENTOR
Gim P. Chan
BY Strauch, Nolan & Neale
ATTORNEYS Jan. 8, 1963   G. P. CHAN   3,072,238
PROGRAM UNIT
Filed Oct. 24, 1960   13 Sheets-Sheet 9
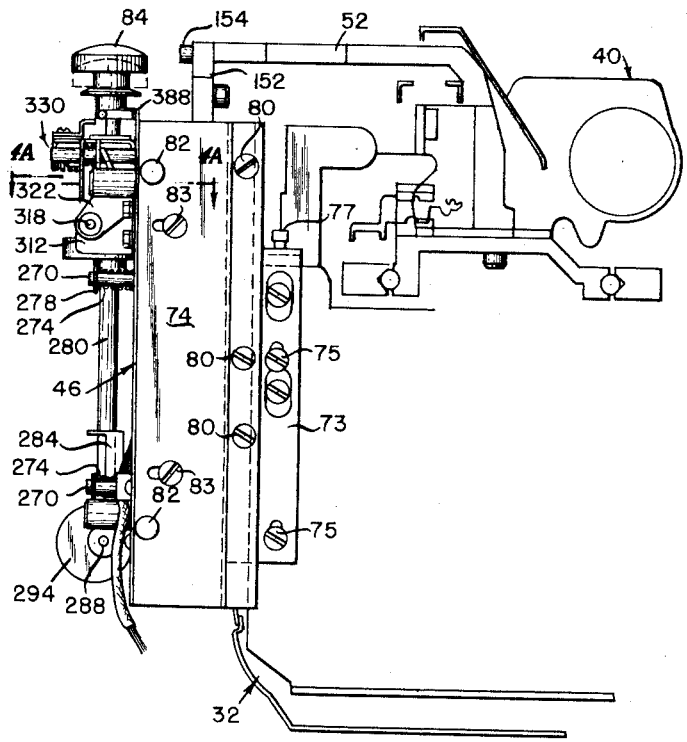
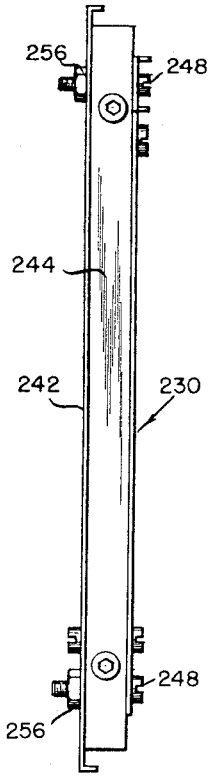
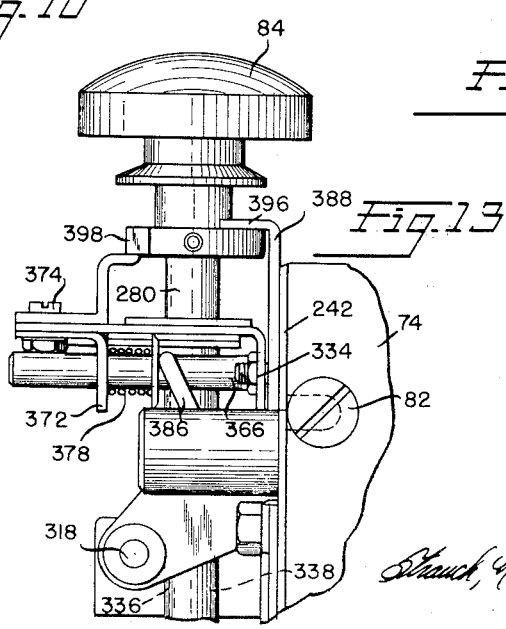
INVENTOR
Gim P. Chan
ATTORNEYS

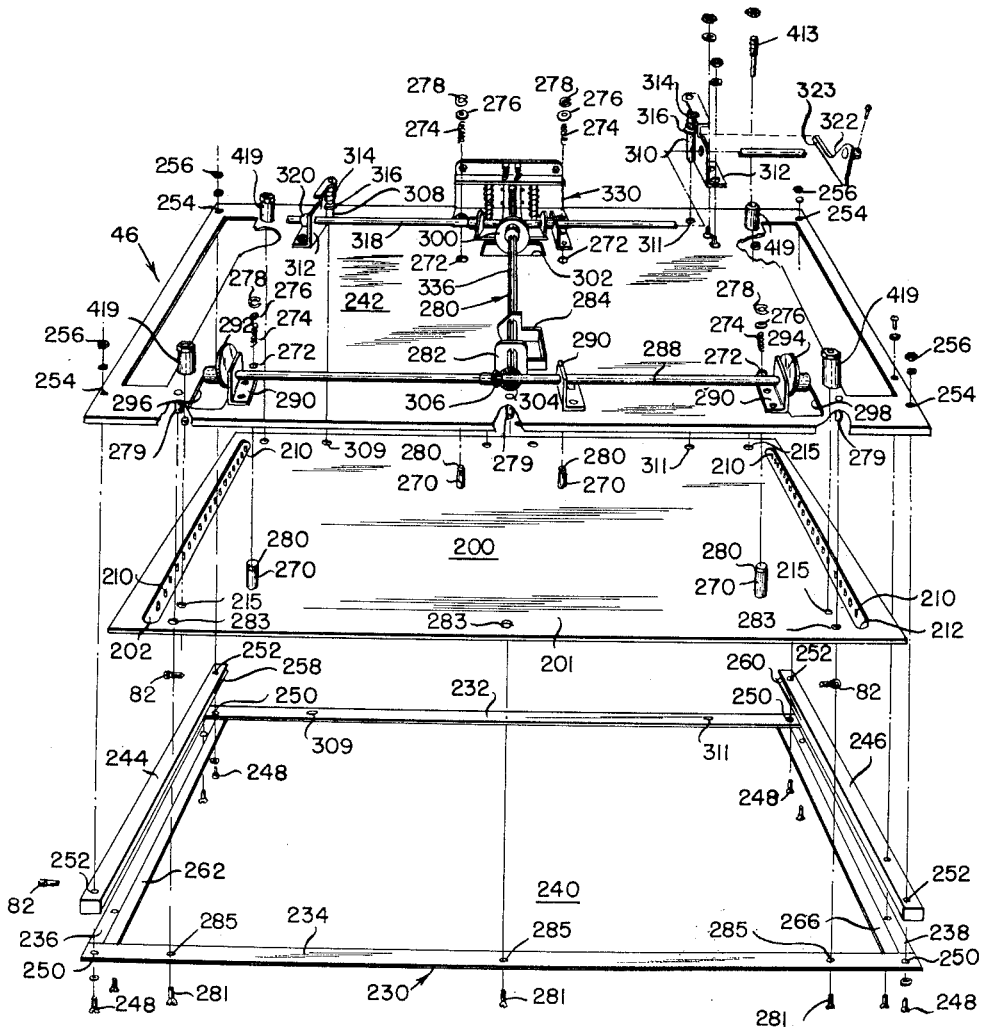

Jan. 8, 1963   G. P. CHAN   3,072,238
PROGRAM UNIT
Filed Oct. 24, 1960   13 Sheets-Sheet 12
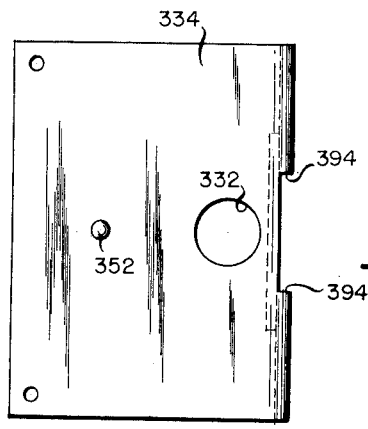
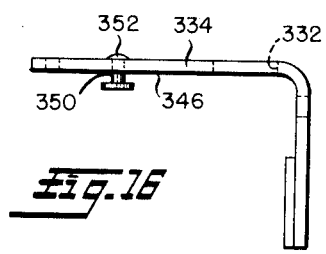
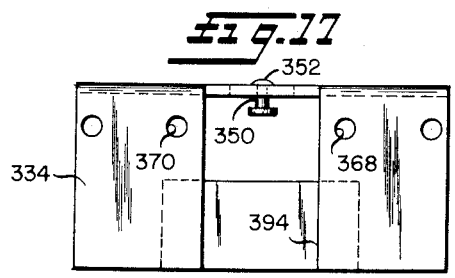
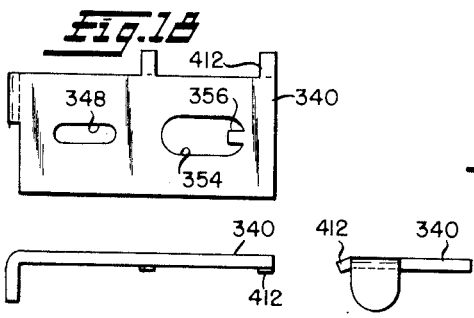
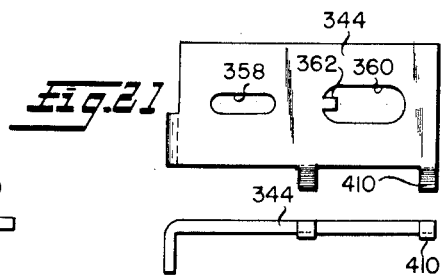
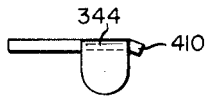
INVENTOR
Gim P. Chan
BY *Strauch, Nolan + Neale*
ATTORNEYS

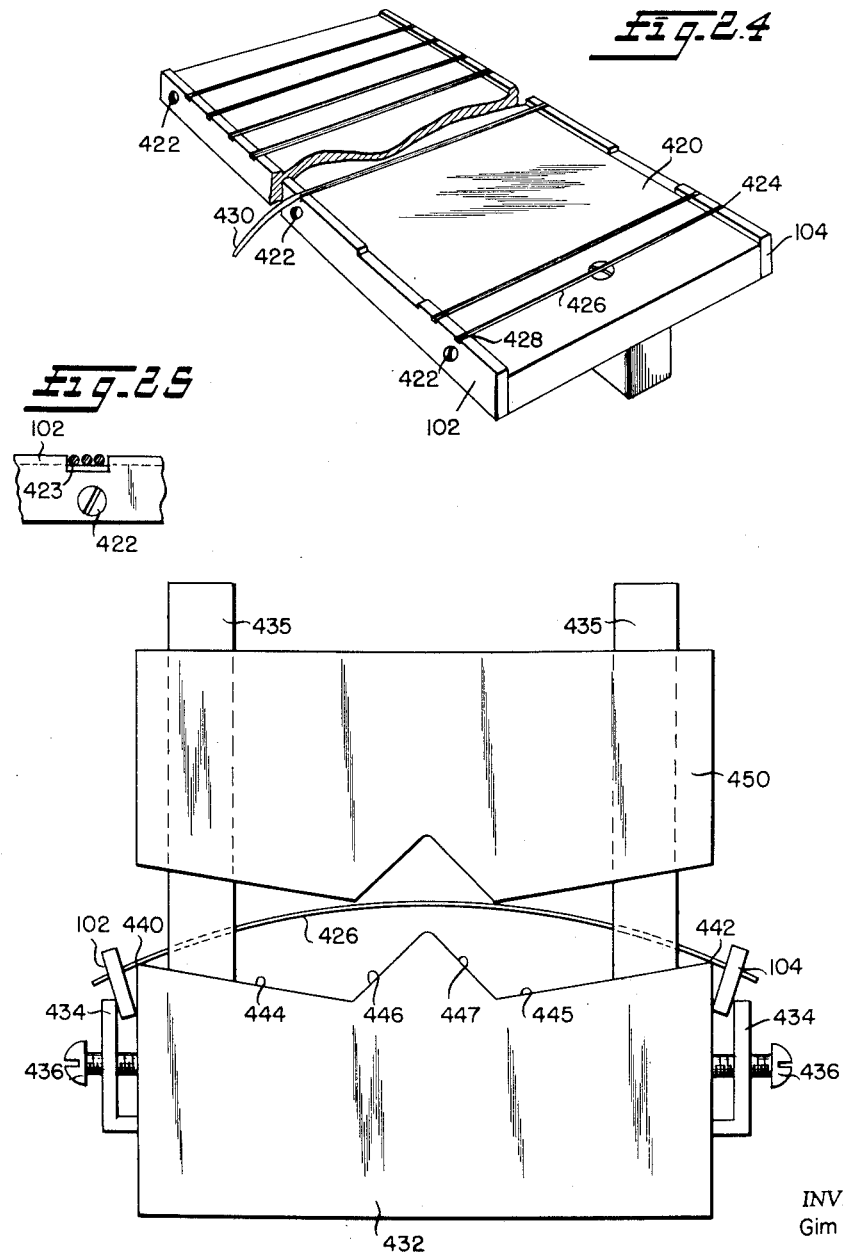

3,072,238
PROGRAM UNIT
Gim P. Chan, Oakland, Calif., assignor to Smith-Corona Marchant Inc., Syracuse, N.Y., a corporation of New York
Filed Oct. 24, 1960, Ser. No. 64,405
44 Claims. (Cl. 197—1)

The present invention relates to improvements in program devices and components thereof for data processing equipment and more particularly to improvements in program devices associated with movable carriage type data input and output devices.

The program device of the present invention is adapted to control the operation of associated data processing equipment and of the associated data input-output equipment in accord with the relative position of a record to be printed, such as an invoice sheet, and the printing position of the printing unit such as a typewriter. In the specific illustrated embodiment of the invention, the input-output device is a power actuated electric typewriter having a fixed printing position and a paper carriage movable transversely of the typewriter base past a fixed printing position.

Programming of such a data processing device requires as many as thirty control functions. Each of these has to be initiated one or more times as the carriage moves to various positions of the invoice. The programming device has to be readily changeable by the customer, reliable, and inexpensive. These requirements are best met by use of printed circuits and punched cards with sliding contacts for sensing of control information on the punched program card. Use of printed circuits makes possible the programming of some thirty control functions in several inches of vertical space—less than was heretofore required for fewer functions provided in other machines for instance.

The three elements of the present program device are as follows:

(1) The printed circuit board, with one contact strip per control function.

(2) The perforated card insulating mask with perforations located horizontally and vertically such that any one or more of the control functions can be initiated at corresponding positions of the typewriter carriage.

(3) The series of contacts or brushes in alignment which can close the circuit to each control function strip wherever a perforation is present.

In the present embodiment, the program device has the contacts attached to the carriage and moving with it, the printed circuit board attached to the typewriter frame, and the perforated card lying between contacts and printed circuits.

The contacts comprise a series of brushes, one per control function strip on the printed circuit board plus additional brushes for other purposes which will be described later, mounted in a frame rigidly attached to the typewriter carriage. Each brush consists of a number of shaped spring wires held at both ends in the frame, multiple contacts being used to provide greater reliability. A material such as beryllium copper is used for making the contact wires because of favorable wear and electrical contact characteristics. The wires are deflected when brush unit and printed circuit board are in engagement. The amount of deflection is a compromise between achieving high pressures for good contact and low pressures for minimum wear on the perforated card and contact wires, and for low drag load on the carriage.

The brush wires have a V-form at the center to provide the actual contact surface. The contact surface is cammed into and out of the perforations in the program card by the sides of the V as the brush moves in either direction with the carriage. The shape of the brushes is thus an important feature because it permits bilateral motion of the carriage without requiring brush retraction during carriage return.

Another important feature of this brush unit is that all brushes need not have a common power supply. This is of value where other conditions may control initiation of one or more functions. It can be used for instance, as a means for preventing initiation of selected functions during tabbing, etc. Means for providing separately controlled power supplies would be to have more than one flexible power supply lead carried by the brush assembly or to have additional brushes riding on special power supply strips on the printed circuit board. The leads or brushes in series with the conditioning switches could then be connected to the appropriate brush set (or sets). Use of additional brushes has been chosen as the approach because it lends itself to "strobing" the power supply, with advantages to be described later.

The perforated card is made of Mylar because of the latter's favorable wear characteristics. Thickness of the Mylar is determined by the need for a compromise between thick stock for long wear life and thin stock for small amplitude of contact spring motion. The size of each hole relative to that of the contact surface of the brushes is large to permit loose tolerances on hole dimensions and location. This eases problems associated with manual punching of cards by the programmer. Alternatively, cards with all possible holes pre-punched (but not perforated, of course) may be used so that the programmer can knock-out the hole-centers with a simple instrument wherever he wishes to have a perforation.

The card holder is designed so that the card is accessible to the machine operator and readily removable for quick changing of programs. For this purpose, the frame on which the printed circuit board is mounted is provided with means for the operator to move it toward and away from the brush assembly, though vertical and lateral motion are not permitted. Thus the board and the card holder can be disengaged from the brushes to permit ready removal and insertion of the program card. When the new card has been inserted, and the printed circuit board returned to the position where all elements are again engaged, a clamping action is exerted to hold the relative alignment of all parts.

The printed circuit board is rhodium-plated for long life and good electrical contact. As presently developed, it includes a "strobe" pattern to which power is supplied by the brushes. The purpose of this "strobe" is to provide a simultaneous initiation of all functions at a given position since some functions have a conditioning effect upon others. Without the strobe, the edges of the holes would have to be aligned accurately and tolerances on the skew of the brush would have to be tight. On the other hand, with long holes to minimize skew effect, the web between holes becomes narrow if the same function is programmed in adjacent positions. Accordingly the holes have been made one carriage-step long to eliminate the web. This allows continuous contact under the conditions mentioned, that is the same function programmed in adjacent positions or columns. The strobe provides for interruption of the signal between positions as such interruptions may be required by the electronic logics.

If the power is to be supplied to some of the circuits directly and to others through conditioning switches this is accomplished by use of more than one power pick off brush. Further, with proper design, multiple strobe patterns may also be utilized to give information to the electronics for determination of the direction of carriage motion or other functions.

While the foregoing has described an embodiment where the brushes supply the power to the circuits as they move over the card and sense the holes, it follows, of course, that the only requirement is to have relative motion between the card and the contacts. Other possible arrangements include the following:

(1) Power supplied through stationary brushes; printed circuit board and card move (or card alone moves) relative to the brushes.

(2) Power supplied through printed circuit cylinder which rotates as perforated card moves past stationary brushes, etc.

Basically the present invention contemplates a novel program unit provided with a novel record support structure by which a columnar program record card may be supported in a predetermined fixed position at the rear of a power actuated typewriter and a novel sensing head mounted for movement with the typewriter carriage to sense, at each columnar position of the carriage, any program indicia which may be recorded in the corresponding columns of a program record on the support to effect a control over the data processing equipment and/or of the input-output equipment in accord with the predetermined significance of the sensed indicia.

The principal object of the present invention is to provide, in combination with a movable carriage type data processing system input-output device, an improved record controlled program device in which the program record can be readily, easily and rapidly interchanged.

A further object of the present invention is to provide, in combination with a movable carriage type data processing system input-output device, an improved interchangeable record controlled program device in which operation of the device under control of an improperly aligned or oriented program record is precluded.

Other important objects of the present invention are to provide individually and in combination with a movable carriage type data processing input-output device:

(1) An improved record card support into which and from which a selected record card can be rapidly inserted and removed;

(2) An improved record card support in the form of a selectively collapsible record card receiving pocket into which a card may be inserted through an open edge thereof and in which a record card can be firmly supported in a predetermined sensing position;

(3) An improved adjustably cantilever mounted record card brush sensing assembly mounted for movement with the carriage within a predetermined enclosed path to sense a record card; and (4) An improved sensing brush assembly adapted for reciprocal movement relative to a fixed record card while in sensing contact therewith, and an improved method of forming brush contacts which are precisely aligned so that contact pressure may be precisely controlled.

These and other objects of the present invention will become more fully apparent by reference to the appended claims and as the following detailed description proceeds in reference to the accompanying drawings in which:

FIGURE 1 is a perspective view of an electric typewriter type data processing input-output device provided with a program unit in accord with the principles of the present invention;

FIGURES 2a and 2b together constitute a diagram illustrating the arrangement and purpose of a perforated program record in the use of the program unit of the present invention;

FIGURE 4 is a fragmentary top plan view of the program unit of the present invention as mounted upon a typewriter type input-output device with the carriage moved to an extreme end position and certain portions broken away to illustrate details;

FIGURE 4a is an enlarged view in section of a portion of FIGURE 4 and along lines 4a—4a of FIGURE 10 illustrating certain parts used only during alignment of the brush sensing assembly on the carriage and program card support structure;

FIGURE 5 is a front elevational view of the program record brush sensing assembly of the program unit of the present invention as it appears looking at the rear of the typewriter of FIGURE 1 with the back portion of the unit removed;

FIGURE 6 is a side elevational view of the assembly shown in FIGURE 5;

FIGURE 7 is a bottom plan view of the assembly shown in FIGURE 5;

FIGURE 8 is a front elevational view of the electrical conductor or commutator plate to which electrical contact is established by the brushes of the program record card sensing brush assembly through the perforations of an interposed perforated program record card;

FIGURE 9 is an elevational view of the program unit of the present invention as viewed from the rear of the input-output unit illustrated in FIGURE 1;

FIGURE 10 is a fragmentary side elevational view of the program unit of the present invention;

FIGURE 11 is an exploded view of the card support structure of the program unit;

FIGURE 12 is a side elevational view of the card support structure of the program unit;

FIGURE 13 is a fragmentary side elevational view of the pocket operating and closing interlock mechanism of the card support structure;

FIGURES 15, 16 and 17 are respectively a top plan, side elevational and rear elevational view of the main support plate of the mechanism illustrated in FIGURES 13 and 14;

FIGURES 18, 19 and 20 are respectively a rear plan view, a side elevational view, and a top plan view of one of the interlock members of the mechanism of FIGURES 13 and 14;

FIGURES 21, 22 and 23 are respectively a rear elevational view, a side elevational view, and a top plan view of the other of the locking members of the mechanism illustrated in FIGURES 13 and 14;

FIGURE 24 is a pictorial view showing the manner by which the contact wires are cut and mounted to side support boards;

FIGURE 25 is an enlarged view showing the three wire ends mounted side-by-side; and FIGURE 26 is an elevation view of the die used to form the contact wires along with one set of contact wires in position to be permanently bent into their desired shape.

General Arrangement

Figure 3:
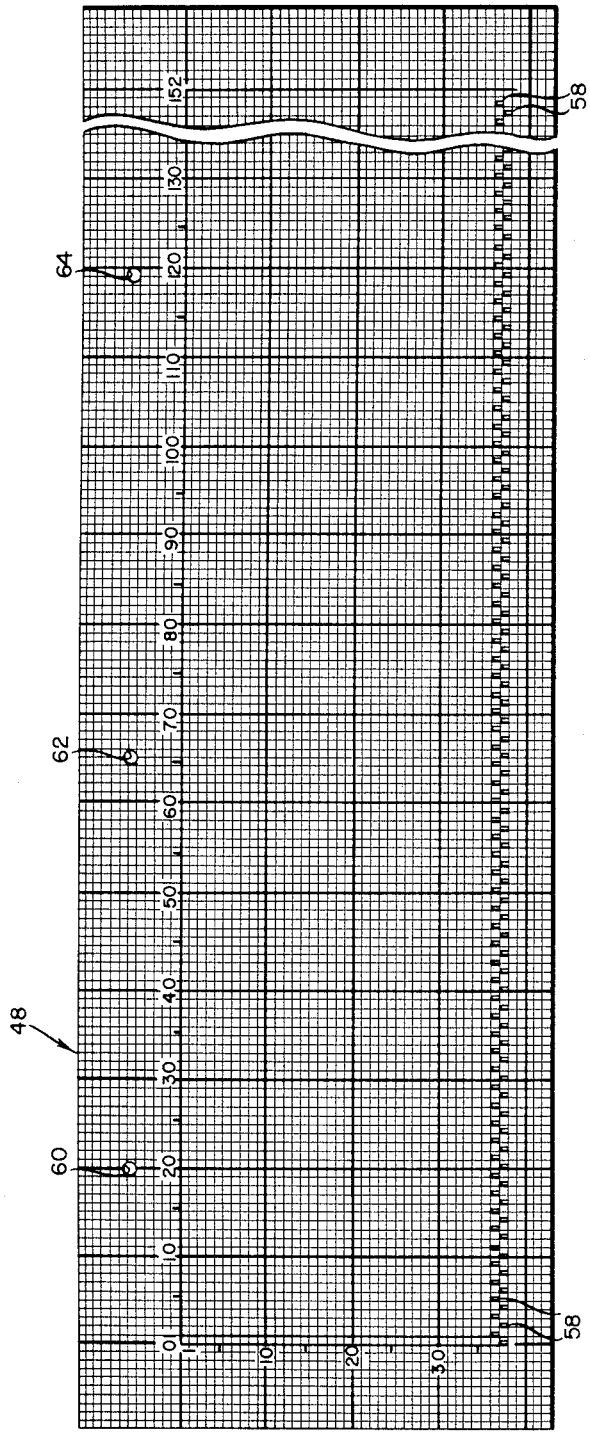
FIGURE 3 is an illustration of the program record card per se, as viewed from the rear of the typewriter when properly oriented for use in the program unit of the present invention.

Referring now in detail to the drawings and particularly to FIGURE 1, there is therein illustrated a data processing system data input and output device in the form of a power actuated electric typewriter 30 provided with a base structure 32 at the front of which is arranged a generally conventional keyboard 34 having a supplemental row of control keys 36 arranged in front of the space bar 38. The typewriter 30 is provided with suitable means by which depression of any numeric key on the keyboard 34 or any of the control keys 36 will generate a signal for transmission to associated data processing equipment and suitable means for actuating the numeric keys upon receipt of predetermined signals from the associated data processing equipment. A paper carriage 40 is conventionally mounted on top of the rear of the base structure 32 for reciprocation transversely of the base structure 32 past a fixed printing position indicated at 42 to which an actuated one of the typebars arranged in the conventional type basket 44 is driven upon actuation of appropriate keys of the keyboard 34.

The movement of carriage 40 to the left as viewed in FIGURE 1 is controlled conventionally by an escapement mechanism (not shown) and a tabulating mechanism (not shown) and its movement to the right as viewed in FIGURE 1 is controlled by a conventional power actuated carriage return mechanism (not shown).

The program unit of the present invention comprises (1) a perforated record card support structure 46 fixed to the rear of the base structure 32 and adapted to receive, through its open top, a selected one of a plurality of interchangeable perforated program record cards such as 48, and (2) a record card sensing brush assembly 50 which, as will be explained presently, is cantilever supported at its upper end from the rear edge of a support plate 52 which is fixed at its forward end to the carriage 40.

As will be noted from FIGURE 1, the brush assembly 50 is disposed between the rear of the typewriter base structure 32 and the card support structure 46 where the brush assembly 50 is fully protected from damage by an external object and the surface of the record card 48 being sensed by the brush assembly 50 is fully protected during the card sensing operation.

Figure 2A:
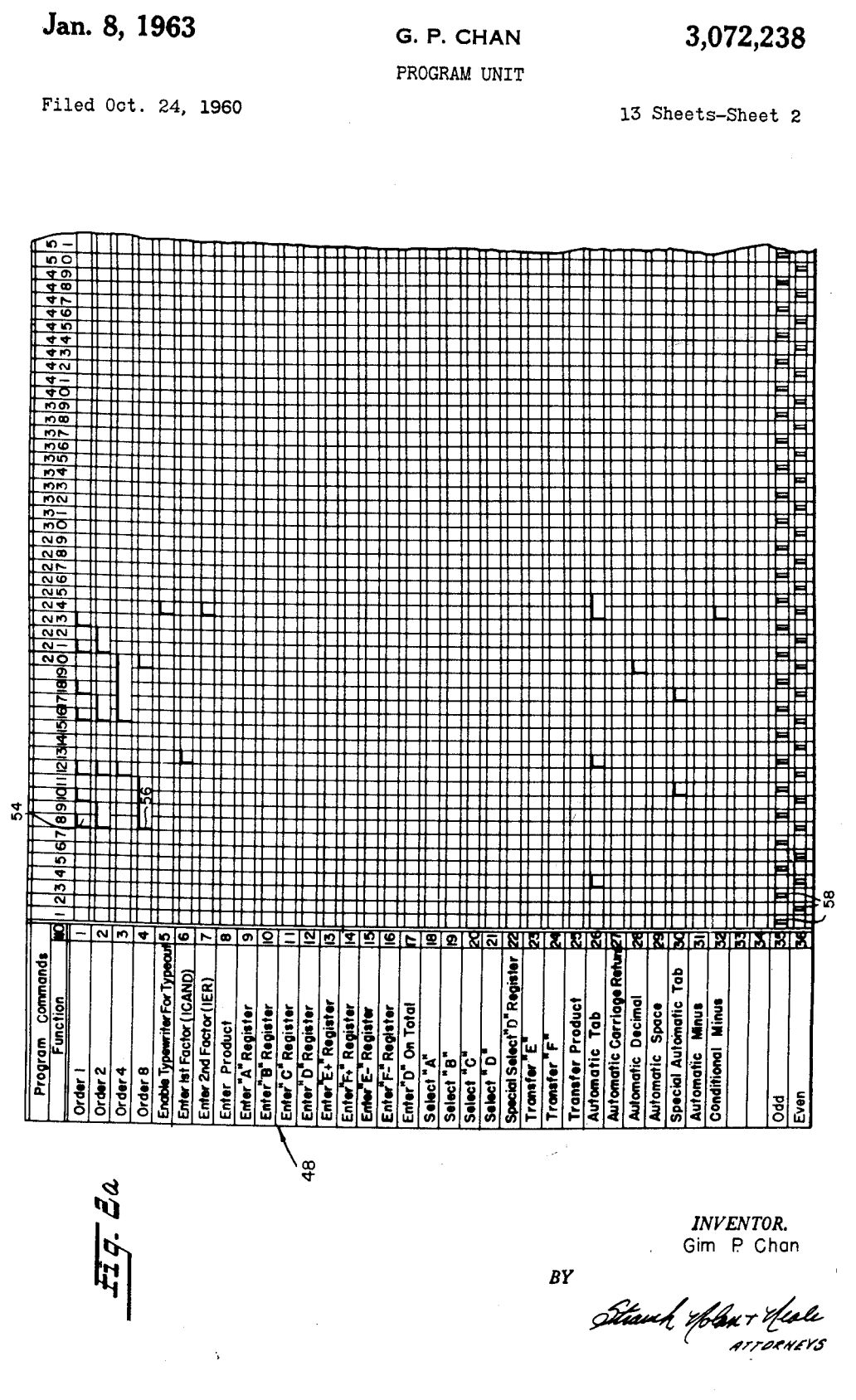

As is apparent from reference to FIGURES 2a, 2b and 3, the record card 48 is a columnar record card having a number of vertical columns equal to the number of space positions across carriage 40, in the illustrated embodiment 152 columns, and is provided with 36 horizontally extending rows. The record card 48 is preferably made of Mylar as such material has been found to have relatively low frictional drag upon the record sensing brushes with resultant long life of the record card. Its thickness is a compromise between thick stock having optimum stiffness for ease in handling and long life and thin stock resulting in small amplitude of required sensing brush movement. In the illustrative embodiment of the invention, a perforation such as 54 in FIGURE 2a indicates that when the carriage 40 reaches the column in which the perforation appears, in this case, column 8, the data processing mechanism associated with the typewriter 30 is to perform the function indicated by the row in which the perforation appears, in this instance "order 1." As is apparent from FIGURE 2a by reference to column 8, more than one function may be required in any given column and the same function may be required in separate columns as indicated at 56 in FIGURE 2a. In the bottom two horizontal rows, (35 and 36 on the diagram of FIGURE 2a), more narrow pre-punched perforations 58, referred to as strobe holes, are provided in alternate columns. Thus in row 35, a strobe hole 58 appears in each of the odd numbered columns 1 through 151 and in row 36 a stroke hole 58 appears in each of the even numbered columns 2 through 152. The purpose of the strobe holes 58, as will become apparent presently, is to assure that the circuits actuated by each perforation appearing in the corresponding column are actuated simultaneously by a circuit through the stroke hole 58 rather than as the sensing brushes contact the perforations 54 and 56, for example, in column 8. Without the stroke holes 58, if the leading edges of the perforations were slightly misaligned due to lack of precision or wear or if the program card 48 or brush assembly 50 were slightly misaligned relative to each other, the sensing brushes will close their associated circuits at slightly different time intervals when two or more perforations appear on a single column of the record card 48. Any such variation in time must be obviated to enable the electronic system to operate satisfactorily.

Referring now to FIGURES 1 and 3, the record card 48 is provided along its top edge with three holes 60, 62 and 64. Holes 60 and 64 receive card positioning pins when the card 48 is in the pocket. Hole 62, which is spaced slightly to the right of the longitudinal center of card 48, cooperates with a card orientation detecting mechanism which, as will be explained presently, is operative to prevent operation of the machine in the event that the record card 48 is inadvertently placed into the support structure 46 in reversed end for end relation.

Referring now to FIGURE 4, the top plan view of the program unit, the record card support structure 46 is a collapsible pocket structure provided with a top opening 68 through which a record card 48 may be inserted and is supported in spaced relation to the rear wall 70 of the typewriter 30 by the Z shaped support brackets 72 and 74 at its opposite ends. Z bracket 72 is fixed to typewriter base 32 through a vertical adjustment mechanism composed of bracket 73, and fasteners 75 and 76. Bracket 73, also shown in FIGURE 10, is secured to base 32 by screw fasteners 75 which fit through vertical slots in bracket 73. A vertical adjustment screw 77 is provided at the top of bracket 73 which serves as a means for providing a precise control of vertical position of each side of the record card support structure 46. Z shaped support bracket 72 is secured at one end by screw fastener 76 to bracket 73, and the corresponding bracket 74 on the other side of the typewriter is secured at one end by screw fasteners 80.

At the outer or rear end of Z brackets 72 and 74, horizontal slots are provided for receiving screw fasteners 83 and 82 respectively, which are secured to card support structure 46. Along the inside surface of Z brackets 72 and 74 and adjacent the front surface of the card support structure 46 are fore and aft adjustment bars 81. Bars 81 are secured to Z brackets 72 and 74 by screw fasteners 83 fitting in horizontal slots for facilitating the precise adjustment of the contact pressure of the brush asesmbly.

As is apparent from FIGURE 4, brackets 72 and 74, the rear wall 70 of the typewriter 30 and the card support structure 46 together define an open top protective enclosure for the path of movement of the brush assembly 50 so that danger of injury to the brush assembly 50 is minimized or prevented. This is an important feature of the present invention.

As will be explained presently, the pocket of the support structure 46 is collapsible after the card has been inserted into its pocket to firmly grip the record card in card sensing position. The collapsing of this pocket and insertion and removal of a perforated record card 48 into and from the pocket of the support structure 46 is controlled by a manually operable control knob 84, the function of which becomes apparent presently.

*Brush Assembly*

The brush assembly 50 is illustrated in detail in FIGURES 5, 6 and 7. This assembly comprises a shallow channel shaped member 90 having laterally extending coplanar flanges 92 and 94 over the open side of which is fixed a plate 96 of a suitable rigid insulating material, such as Plexiglas, by rows of screws 98 and 100. Along the opposite edges of Plexiglas plate 96 are fixed elongated strips 102 and 104 of copper cladded phenolic board by rows of screws 106 and 108 respectively. Copper cladded phenolic board strips 102 and 104, together with the Plexiglas plate 96, define a channel shaped body of insulating material the open side of which is closed, at the lower end of the assembly as shown in FIGURE 5, by a narrow Plexiglas plate 110 bridging the space between the side walls 102 and 104, and, by a further and larger Plexiglas plate 112 bridging the space between the copper cladded phenolic board strips 102 and 104, over the major portion of the length of the brush assembly 50 as is apparent from FIGURE 5. Plates 110 and 112 are cemented at their opposite edges to the abutting edges of the copper cladded phenolic board strips 102 and 104. The lower plate 110 is provided with two transversely extending through openings 114 and 116 located midway between the strips 102 and 104 which provide guide slots for power pick-off brushes 118 and 120 which are adapted to provide two separately conditioned power sources through the etched conductors on copper cladded board 102 and 104 to brushes 140.

Each of the brushes 118 and 120 comprises a plurality, in this instance three, of identical brush wires 122, preferably beryllium copper, each having a central V shaped portion 124 projecting through the aperture 114 and having, at its tip, a rounded external surface 126 merging symmetrically in opposite directions into external camming surfaces 128 and 130. The rounded surface of the tip 126 of the brush wires 122 assures that the brush will be able to slide smoothly over an unperforated surface of a perforated record card with minimum wear upon the card, and the camming surfaces 128 and 130 assure that the brush wire 122 will, when the tip 126 is in engagement with a perforation in the record card, smoothly cam the tip 126 from engagement with a perforation in the card into sliding engagement with the unperforated portion of the record card regardless of the direction of movement of the brush longitudinally of the record card. The arch shaped intermediate portion of each of the brush wires 122 is resiliently supported by laterally extending portions 132 and 134 of wire 122 extending between the plates 110 and 96 in spaced relation and fixed at their respective end regions to the copper cladded phenolic board strips 102 and 104 respectively.

To assure that the rounded external surfaces 126 of each wire of each of the contacts lies in a common plane, a special method, in accordance with one feature of my invention, of forming the contour of brush wires 122 has been utilized which will now be described.

The contact wire is conventionally shipped from the manufacturer in the form of a coil. The phenolic board strips 102 and 104 are secured to opposite sides of a jig member 420 shown in FIGURE 24 as by fasteners 422 to be exactly parallel and spaced apart a predetermined distance. Small slots 423 (see also FIGURE 25) are provided in strips 102 and 104 for receiving the ends of the contact brush wires 426.

A first end 424 of a group of three contact wires 426 is soldered in position in a slot 423 in strip 104 and the group of three wires is stretched taut across jig member 420 before soldering at end 428 on strip 102. The wires, when stretched taut, are oriented so that the natural curvature provided by the coil at the free end 430 is directed downwardly and the free ends on each of the wires are substantially parallel with each other. The length and internal stresses in each wire are thus approximately equal when the second end 428 is soldered. The wire is then cut about 1/16 inch from the edge of strip 102.

After all contact strips are soldered, fasteners 422 are removed and the assembly separated from jig member 420 for further processing. When the assembly is separated from jig 420, it has an appearance similar to that shown in FIGURE 26.

The die assembly shown in FIGURE 26 comprises a base member 432 having a length comparable to the length of strips 102 and 104. Four pins 435 extend upwardly from each of the four corner positions to serve as guides for upper die member 450. On opposite side walls are clamp elements 434 and screws 436 which may be tightened so that strips 102 and 104 are lightly clamped when wires 426 rest on corner edges 440 and 442 of base member 432.

The upper surface of base mmeber 432 has a pair of surfaces 444 and 445 which slope inwardly and downwardly. At the center, an inverted V section is provided having sloping surfaces 446 and 447 and terminating in an apex having a small radius of curvature.

The lower surface of the upper die member 450 has a complementary configuration so that when it is pressed downwardly, all of the wire groups are simultaneously forced across the upper surface. Sufficient force is used to cause permanent deformation of the wires forming wire groups 426. Care must be taken at all steps to prevent the wires in each individual group 426 from crossing.

After upper die member 450 is raised, the wires have a permanent configuration similar to that shown in FIGURE 7. With a spacing of approximately 2.25 inches between strips 102 and 104, the diameter of each individual wire is preferably 10 mils. With a greater spacing, larger wire diameters up to approximately 20 mils may be used while smaller spacings between strips 102 and 104 may require wire diameters of as little at 5 mils. The important consideration is that the spring contact force must be sufficient to provide reliable electrical contact and yet not exceed that which assures long life for the perforated program card. Accordingly, the spacing between strips 102 and 104 and the diameter of the individual wires must be correlated and generally maintained between the limits specified above to provide satisfactory results.

By the novel method of forming the contact wires just described, each wire in each wire group is made the same length, and by using only lengths of new wire that are free of sharp bends, substantially uniform internal stresses and resilience are obtained thereby providing parallel configurations. By forming the V contact portions after securing the ends of the wires to strips 102 and 104, the upper curved portion 126 (FIGURE 7) of each group of wires forming each contact is located along a straight line centrally located between strips 102 and 104 and lies at a uniform distance from a reference plane such as the surface of plate 96.

Until plates 110 and 112 (FIGURES 5, 6, 7) of an insulating material such as Plexiglas, are secured to the upper surfaces of strips 102 and 104, the contact wire groups are not sufficiently braced to prevent sidewise movement. Each of plates 110 and 112 is provided with a row of transversely extending slots 138 equal in number to the number of rows of the record card 48 in which perforations may appear in the particular installation. For the record card diagrammed in FIGURES 2a and 2b, a minimum of thirty-four slots 138 is required, thirty-two for program command functions and two for odd-even strobe function. In addition, a top brush 141 and a bottom brush 143 are provided for electrically aligning the brush assembly of FIGURES 5-7 with the printed circuit board of FIGURE 8 as will be described below.

For simplicity only three of the apertures 138 at the top of plate 112 and four at the bottom are indicated in FIGURE 5. Sensing brushes 140, each of identical construction and mounting to the brushes 118 and 120, are associated with each of the slots 138. The brushes 140 from top to bottom, excepting the top and bottom brushes 141 and 143, cooperate with the corresponding command control rows of the record card 48, which in the embodiment as illustrated in FIGURES 2a and 2b, would be rows 1–32 and odd and even respectively.

In order to minimize the collection of dust particles upon the sensing brush assemblies 118 and 120 and 140, a pair of hair dust brushes 142 and 144 are disposed at opposite sides of the brush structure heretofore described, being mounted upon a channel shaped member 146 secured to the channel shaped member 90 by screws 148 in position to engage the Mylar record card 48 and brush off any dust which may have collected on the record card 48 before it is engaged by the sensing brushesh 118, 120 and 140 in either direction of movement of the sensing mechanism brush assembly 50 relative to the record card 48.

The brush assembly 50 is rigidly fixed to the rear end of the plate 52 (see FIGURES 1 and 6) by an intermediate adjustment plate 152 fixed to the plate 52 by screws 154, plates 152 and 52 being interlocked by key surfaces at 156 and 158 as shown in FIGURE 6. Plate 52 constitutes the sole support for brush assembly 50. The channel shaped member 90 receives, at its upper end the member 152 and is fixed to the member 152 by three mounting screws 160, 162 and 164. The apertures in the base wall of the channel member 90 through which the screws 160, 162 and 164 extend are slightly larger than the external diameter of the shanks of screws 160, 162 and 164 to permit limited relative pivotal movement of the members 90 and 152 about the axis of the boss 184. The rear face of the member 152, as viewed in FIGURE 5, and the opposed abutting face of the base of the channel member 90 are opposed planar surfaces lying in planes normal to the axis of the boss 184. When the assembly 50 is positioned upon the member 52, the position of the assembly 50 about the axis of boss 184 is adjusted by an adjusting screw 166 and locknut 168 threaded through a weld nut 169 fixed to the side wall 170 of the channel member 90 and abutting the side face 172 of the member 152 in cooperation with the opposing resilient biasing force of a spring 174 compressed between the side wall 176 of the channel member 90 and the end wall of a spring retainer bore 178 formed in the side wall 180 of the member 152. Once the desired relative position of the members 152 and 90 is established, the member 90 is locked in position by the tightening of the screws 160, 162 and 164.

Bosses 182 and 184 near the lower contact 143 and upper contact 141 respectively are rigidly secured to channel member 90. Each boss has an internally threaded bore 186 and 188 respectively and a set screw 189 having an outer end 191 which is provided with a small counterbore. When the brush contact assembly is completed, set screws 189 are threaded into the bores of bosses 182 and 184 and adjusted to a position so that the distance "X" shown on FIGURE 6 between surface 191 and the ends 126 of the brush contacts is a predetermined amount. This, as explained below, makes it possible to precisely control the contact pressure against the perforated record card and program panel.

*Commutator Board*

The brush assembly 50 in its movement with the carriage 40 moves longitudinally across commutator board 200 illustrated in detail in FIGURE 8. The commutator board 200 comprises a metal base plate 201 to which is fixed a plate 202 of suitable insulating material. Upon plate 202 is disposed, as by conventional printing circuit techniques, a group of horizontally extending, vertically spaced conductor strips 204 equal in number to the number of brushes 140 of the brush assembly 50 and at the bottom a pair of conductor strips 206 and 208 cooperating with the power brushes 120 and 118 respectively. The conductor strips 204 each lead to one of a series of terminals 210 adjacent opposite ends of the commutator board 200 and the strips 206 and 208 lead to terminals 212 and 214 respectively. Terminals 210, 212 and 214 extend through plate 202 and are in alignment with elongated apertures in the metal plate 201 so as to be electrically isolated therefrom. Lead wires are connected as required to each of the terminals 210 and to the terminals 212 and 214.

As will appear presently, in operation of the program device, a perforated record card 48 of the type shown in FIGURE 3 is placed in overlying relation to the surface of the commutator board 200 shown in FIGURE 8 and the brush assembly shown in FIGURES 5, 6 and 7 with its longitudinal axis extending transversely of the commutator board 200, is moved longitudinally of the board 200 to sense successive columns of the record card 48. When a brush of the brush assembly 50 is moved into alignment with a perforation in the record card 48, it will make electrical contact with the aligned one of the conductor strips 204 on the commutator board 200 to establish a control circuit.

It will be observed from FIGURE 8 that the upper conducting strip 205 and lower conducting strip 207 are formed in two parts with a small space 209 of approximately 1/10 inch corresponding to the displacement between adjacent stable carriage positions. These are used as test strips for checking electrically whether or not the brush assembly of FIGURES 5–7 is properly aligned with the commutator board of FIGURE 8.

On opposite sides of each space 209, a short portion having an edge 211 facing the adjacent contact strip 204 is located so that it is the same distance from the edge of the adjacent contact strip as the facing edges of strip 204 are from one another. Edge 213 of upper strip 205 is spaced sufficiently far from the adjacent strip 204 that the upper brush 141 (FIGURES 5 and 6) will not make electrical contact with strip 205 when the program board of FIGURE 8 is properly aligned. It will be noted from FIGURE 5 that all the brushes including upper brush 141 are uniformly spaced. Thus, with the wider space between upper strip 205 and adjacent strip 204, brush 141 is not intended to contact strip 205 except at the short portions 211.

Lower strip 207 is constructed in a manner similar to upper strip 205. Lower brush 143 normally is not in contact with lower strip 207 excepting at the carriage positions on opposite sides of space 209.

In view of the equal spacing between brushes 140—141 and 140—143 and the increased space between upper strip 205 and its adjacent strip 204 and lower strip 207 and its adjacent strip 204, an electrical check may be made to determine whether the program board is exactly horizontal since electrical contact by brushes 141 and 143 with strips 205 and 207 will be made if either end of the program board is low or high.

Spaces 209 may be used as an electrical check to determine whether the upper and lower ends of the brush contact assembly of FIGURES 5–7 are vertically aligned. Actual vertical alignment of the brush contact assembly is provided by pins which may be made to extend through holes 215 at the four corners of the program board as is discussed below.

*Card Support Structure*

The card support structure 46 is most clearly illustrated in FIGURES 9 and 11. Referring to FIGURE 11 which is an exploded pictorial view looking upwardly and forwardly from the bottom rear, the card support structure 46 comprises a front wall 230 formed by a top member 232, a bottom member 234, a first side member 236 and a second side member 238 defining a frame for a central rectangular opening 240. The back wall of the card support structure 46 is an apertured plate 242. The plate 242 is maintained in spaced parallel relation with the frame 230 by a pair of side members 244 and 246. The frame front wall 230, the back wall plate 242, and the side members 244 and 246, in assembly, are rigidly connected together by screws 248 at each corner extending through apertures 250 in the frame 230, apertures 252 in the side members 244 and 246, apertures 254 in the plate 242 and threadedly engaging nuts 256. The upper ends of side members 244 and 246 are provided with V-shaped grooves 258 and 260 respectively of progressively downwardly decreasing depth. As a result, a program card 48 inserted between the plate 242 and the frame 230 will be guided by the grooves 258 and 260 into a longitudinally centered position.

As is apparent from FIGURE 11, the program panel board 200 of FIGURE 8 is interposed between the frame 230 and the plate 242 with the metal plate 201 on its rear side mounted adjacent plate 242 and the insulator plate 202 having the conductive strips as illustrated in FIGURE 8, facing the opening 240 in the frame 230. Fixed to the metal plate 201 of the commutator board 200 are a plurality of guide studs 270 which project through aligned apertures 272 in the plate 242, through compressed compression springs 274 and washers 276 and receive horseshoe spring clips 278 in their annular grooves 280. By this construction the commutator board 200 is mounted upon the plate 242 for movement toward and from the opening 240 of frame 230 and is biased by the springs 274 away from the opening 240 of the frame 230 toward the plate 242. Bottom support for the program card is provided by three studs 279 which are secured to plate 242 and pass through apertures 285 in plate 201 to abut against lower frame member 234. Screws 281 extend through apertures 285 in lower frame member 234 to be threadedly received in studs 279.

Commutator board 200 and the frame 230 thus form a collapsible pocket into which a record card may be inserted in a card receiving station and by which the card may be transferred, by pressing the commutator board 200 toward the frame 230, into a card sensing station. The side of frame members 230, 232, 262 and 266 may be covered with a slightly compressible material, such as felt, to clamp the side edges of the Mylar program card of FIGURE 3 to thus securely hold the card all around the field where the perforations appear.

The movement of the commutator board 200 toward frame 230 is effected by pivotal movement of a main operator shaft 280 which is controlled from the control knob 84 shown in FIGURE 9 in a manner which will be described presently. Shaft 280 is journalled on plate 242, at its lower end by a bearing 282 and at its upper end by L-shaped support bracket 334 (see also FIGURE 13). The limits of pivotal movement of shaft 280 are determined by a stop member 284 fixed to the shaft 280.

As illustrated in FIGURES 9 and 11, shaft 280 is at its extreme counter clockwise position (as viewed from above knob 84) in which the stop member 284 abuts the surface of the plate 242 to the right of the shaft 280 as viewed in that figure. Rotation of shaft 280 in a clockwise direction from that position will bring the member 284 into contact with the plate 242 on the opposite side of shaft 280 as a second stop position and in that position the member 284 is effective to close the contacts of the card-in-place interlock switch 286 shown in FIGURE 9. The system is in operative condition only when switch 286 is closed.

Shaft 280 is geared to a transversely extending shaft 288 journalled upon plate 242 by bearings 290 and upon the opposite ends of which are fixed a pair of cams or eccentrics 292 and 294 in alignment with apertures 296 and 298 in the plate 242. Fixed to shaft 280 is a similar cam or eccentric 300 in alignment with an aperture 302 in the plate 242. Shafts 280 and 288 are thus connected together for concomitant pivotal movement by meshing bevel gears 304 and 306 fixed respectively to the shafts 280 and 288. By this construction, as the shaft 280 is pivoted from its first limit position as shown, toward its opposite limit position, it will impart rotation to the cams 300, 292, and 294 which will, through the apertures 302, 296 and 298 respectively, engage the rear surface of the metal plate 201 of the commutator board 200 and force it toward the frame 230 in opposition to the biasing force of the springs 274. Shortly before the stop member 284 reaches its opposite limit position, the cams 300, 292 and 294 pass through their maximum rise to a small flat or top dead center position so that, in the opposite limit position of shaft 280, the springs 274 tend to bias the cams 300, 292 and 294 in the same direction as they are moved so that there will be no tendency toward reversal of movement of shaft 280 due to the biasing force of the springs 274. Reverse pivotal movement of the shaft 280 will reverse the movement of the cams 300, 292 and 294 to permit the commutator board 200 to be restored to its position adjacent the plate 242 under the influence of the springs 274. Cams 292, 294 and 300 thus form a pressure applying means for moving the wall of the pocket formed by commutator board 200 toward the frame 230 to collapse the pocket and thereby shift an interposed record card from the card receiving to the card sensing station where its surface exposed through opening 240 will be in a plane parallel to the paths of reciprocal movement of carriage 40 and brush assembly 50 through which plane the tips 126 of the brushes 140, 118 and 120 are biased when in alignment with a perforation in the program record.

With continued reference to FIGURE 11, and also to FIGURES 4 and 9, retractable record card locating pins 308 and 310 are provided adjacent opposite sides of the top of the plate 242. Pins 308 and 310 are mounted for reciprocal movement upon support brackets 312 and are resiliently biased to their inward card engaging position by springs 314 compressed between the brackets 312 and collars 316 on the pins 308 and 310. Aligned apertures 309 and 311 for the respective pins 308 and 310 are provided in the plate 242, the commutator board 200, and top front wall member 232. Pins 308 and 310 are adapted to pass through the apertures 64 and 60 respectively (FIGURE 1) of the record card 48 for precisely positioning card 48 in the support structure.

Pins 308 and 310 are retracted by lifting the knob 84, which slides axially along shaft 280, to impart pivotal movement to a shaft 318. Levers 320 and 322 are fixed to shaft 318 and in engagement respectively with the collars 316 of the pins 308 and 310. Lever 322, best shown at the upper right hand corner of FIGURE 11, has an outer surface 323 which engages collar 316 on pin 310. An identical construction is used in connection with pin 308. Pivotal movement of the shaft 318 will cause the levers 320 and 322 to retract pins 308 and 310 through the plate 242 in opposition to the biasing force of the springs 314, associated therewith to permit insertion or removal of the record card 48. If the perforations 60 and/or 64 are not in proper alignment with the pins 308 and 310 when the card 48 is placed within the pocket, the shaft 318 is free to restore to its normal position but the pins 308 and 310 will remain in their retracted positions due to the interposition in their path of movement of unperforated portions of the card 48.

Figure 14:
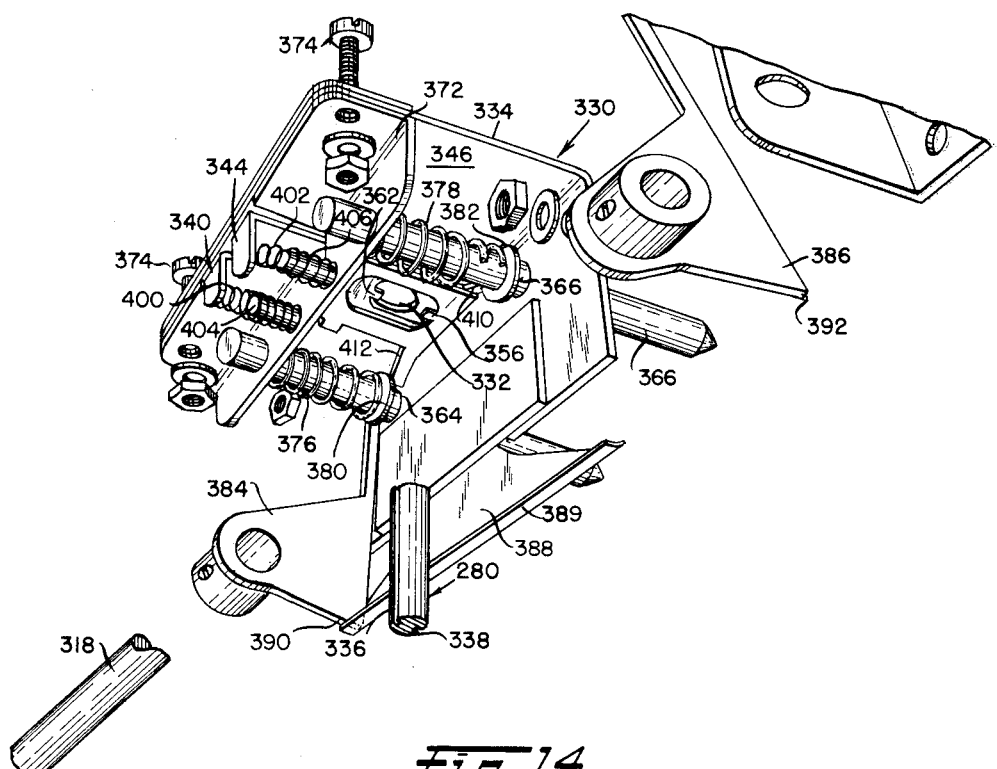
FIGURE 14 is a perspective exploded view of the mechanism illustrated in FIGURE 13.

The proper position and orientation of a record card 48 within the card support structure 46 is determined by a card orientation and position detecting mechanism 330 best illustrated in FIGURE 14 which is operative to prevent rotation of the shaft 280 if there is no record card within the support structure 46, or if a record card within the structure 46 is improperly positioned therein, such as by being reversed end for end from its proper position.

Referring now also to FIGURE 14, shaft 280 extends upwardly through an aperture 332 in an L-shaped support bracket 334 fixed to plate 242. The shaft 280 has a pair of diametrically opposed longitudinally extending straight side wall grooves 336 and 338. Mounted upon the underside of bracket 334 are a pair of locking plates 340 and 344. Support bracket 334 is illustrated in detail in FIGURES 15, 16 and 17; locking plate 340 is illustrated in detail in FIGURES 18, 19 and 20; and locking plate 344 is illustrated in detail in FIGURES 21, 22 and 23. Locking plate 340 is thus mounted for sliding movement parallel to the lower face 346 of bracket 334, its elongated aperture 348 surrounding the shank 350 of the stud 352 riveted to bracket 334, and its elongated aperture 354 being in alignment with the aperture 332 of the bracket 334. Tooth or locking dog 356 projects from one end of the elongated aperture 354. This tooth 356 is adapted to lockingly engage the elongated groove 338 of the shaft 289 when locking plate 340 is moved to the left from its position as shown in FIGURE 14, and to thereby prevent rotation of the shaft 280.

Locking plate 344 of FIGURES 21, 22 and 23 is provided with an elongated aperture 358 which surrounds the shank 350 of the stud 352 and is retained by stud 352 on the bracket 334 for relative sliding movement between the underface of the member 340 and along lower face 346 of bracket 334. Locking member 344 is also provided with a larger elongated aperture 360 and with a tooth or locking dog 362 at one end, the end opposite the end at which the tooth 356 is formed in the aperture 354. Tooth 362 is adapted to lockingly engage the longitudinally extending groove 336 on the opposite side of the shaft 280 and to prevent rotation of the shaft 280 when so engaged.

The positions of the locking members 340 and 344 are controlled by a pair of perforation sensing pins 364 and 366 respectively which project through the apertures 368 and 370 of the member 334 shown in FIGURE 17. Pins 364 and 366 are further slidably received in alinged apertures of and supported by an L-shaped bracket 372 fixed to the underside of the bracket 334 by bolts 374. Pins 364 and 366 are biased to the right as viewed in FIGURE 14 by coil compression springs 376 and 378, surrounding the pins 364 and 366 respectively and compressed between the bracket 372 and collars 380 and 382 fixed to the pins 364 and 366 respectively.

Pins 364 and 366 are retracted (to the left as viewed in FIGURE 14) simultaneously with the retraction of the card support pins 308 and 310 by rotation of the shaft 318 by pivot levers 384 and 386 fixed to shaft 318 and engaging the collars 380 and 382 respectively. Lever 384 is clearly shown in FIGURE 14 and lever 386 is identical therewith. For this purpose counter clockwise pivotal movement of the shaft 318 is effected by raising lifter member 388, the turned-up bottom lip 389 of which engages the levers 384 and 386 at their lower edges 390 and 392 respectively. The lifter member 388 extends upwardly through a channel between edges 394 in the rear wall of the bracket 334 (see FIGURE 15) and in sliding contact along the rear wall of backing plate member 242 and, as illustrated in FIGURE 13, has a turned over top portion 396 lying above a collar 398 fixed to knob 84. By this construction, when the knob 84 is pulled upwardly, collar 398 engages top portion 396 of lifter member 388 and causes lifter member 388 to rise and lip 389 to engage the ends 390 and 392 of the pivot levers 384 and 386 respectively to impart counter clockwise motion to shaft 318 and overcome the biasing force of the springs 376 and 378 on pins 364 and 366 as shown in FIGURE 14 and simultaneously overcome the biasing force of the springs 314 biasing pins 308 and 310 as shown in FIGURE 11 and discussed above.

Referring again to FIGURE 14, the locking members 340 and 344 are normally biased to the left as viewed in that figure by springs 400 and 402 supported by studs 404 and 406. As so biased, the locking tooth 362 will be disengaged from the groove 336 of shaft 280 and the locking tooth 356 will be engaged with the groove 338 of shaft 280.

The position of the locking members 340 and 344 is determined further however by the position of the collars 382 and 380 which are fixed on pins 366 and 364 respectively. These collars 382 and 380 engage the projecting lugs 410 and 412 formed at the sides of the members 344 and 340, respectively, as shown in FIGURES 18-23. The biasing force of the springs 378 and 376 on the locking members 344 and 340 respectively is in opposition to and greater than the biasing force of the springs 402 and 400. Springs 400 and 402 serve primarily, therefore, to cause lugs 412 and 410 on lock plates 340 and 344 to follow the position of pins 364 and 366.

By this arrangement, if the sensing pin 364 is in alignment with a perforated portion of a record card, i.e. fits through hole 62 in the program card (see FIGURE 1), the pin 364 will be in its right hand position as illustrated in FIGURE 14 so that its collar 380 will engage the projection 412 and overcome the biasing force of the spring 400 to shift the lock plate 340 to the right as viewed in FIGURE 14 to hold locking tooth 356 away from groove 338 of the shaft 280. Conversely, if sensing pin 364 engages card material, it will be held in a retracted position with collar 380 positioned to the left as viewed in FIGURE 14 whereby locking plate 340 will be similarly displaced to the left with lug 412 in engagement with collar 380. With locking plate so displaced, locking tooth 356 will extend into groove 338 of shaft 280 and prevent rotation of shaft 280 which, as explained above, prevents the printed circuit board of FIGURE 8 from coming into contact with the contacts on the brush assembly of FIGURES 5-7.

Unless sensing pin 366 is in engagement with a non-perforated portion of a record card, spring 378 will force the sensing pin 366 to the right as illustrated in FIGURE 14, so that its collar 382 will engage the projection 410 at the side of the member 344 and shift the locking member 344 to the right as viewed in FIGURE 14 in opposition to the biasing force exerted on it by the spring 402 to shift locking tooth 362 to a position, as illustrated, in which it is in engagement with a groove 336 of the shaft 280.

From the foregoing it is clear that for the shaft 280 to be free to rotate, the pin 366 must engage an unperforated portion of the record card 48 and the pin 364 must engage a perforated portion of the record card 48. If there is no card in the card support, pin 366 will be in its right hand position whereby locking tooth 362 will prevent rotation of the shaft 280. If there is a card 48 in the card support 46 that does not have a perforation in alignment with the sensing pin 364, pin 364 will be in its left hand position whereby locking lug 356 will prevent rotation of the shaft 280. If there is a card 48 in the card support 46 and there is a perforation in alignment with the pin 366, the locking lug 362 will prevent rotation of the shaft 280 irrespective of the position of the sensing pin 364.

This arrangement is utilized to prevent rotation of the shaft 280 by an operator who has placed a record card 48 in the card support 46 in improper orientation.

Referring to FIGURE 1, the perforation 62 provided in the top edge of the record card 48 is adapted to cooperate with the sensing pins 364 and 366. The sensing pins 364 and 366 are equidistantly spaced from the longitudinal center of the card 48 when in the card receiving station, and the aperture 62 of the card 48 is positioned to be aligned with pin 364 when properly placed and with pin 366 when reversed end for end. By this arrangement, both locking teeth 356 and 362 will be out of engagement with the grooves 336 and 338 of the shaft 280, and shaft 280 will be free to rotate to permit movement of the commutator plate 200 toward the brush contacts when the card is properly positioned and oriented. If the record card 48 is reversed end for end, the aperture 62 will be in alignment with the sensing pin 366 and no perforation will be in alignment with pin 364 so that both locking teeth 356 and 362 will be in engagement with the grooves 338 and 336 respectively of the shaft 280 to prevent rotation of the shaft 280 to move the record 48 into the card sensing position. If no card 48 is in the card support structure 46, pin 366 will project forwardly so that tooth 362 will lock shaft 280 against rotation. This last locking condition is essential to prevent movement of the commutator board 200 toward brush assembly 50 with no card interposed therebetween as contact would be established between all brushes of the brush assembly 50 and all conductors of the commutator board 200 simultaneously.

Alignment of program board 200 of FIGURE 8 with contact brush assembly of FIGURES 5-7 after assembly and before use of the system may be accomplished in the following manner, though the sequence of steps may vary from the order described below. The typewriter carriage is moved to one of its extreme marginal positions such as that illustrated in FIGURE 4. In the brush assembly (see FIGURE 6) screws 189 inside bosses 182 and 184 are turned out to their adjustment position so that their outer surface 191 is located a predetermined distance "X" from the tip portion 126 of the spring contacts 141, 140 and 143. This predetermined distance "X" is illustrated also on FIGURE 4a.

Inside boss 419 (see FIGURE 4) is a threaded adjustment screw 413 (see FIGURE 4a and upper right hand corner of FIGURE 11). Normally screw 413 is totally recessed inside boss 419, but during the alignment procedure, screw 413 is turned inwardly as far as possible so that it extends through aperture 215 of the printed circuit board 200 (see also FIGURE 8 as well as FIGURE 4a). The shank portion 416 of screw 413 has a reduced diameter end portion which fits in a blind bore in the center of surface 191 of screw 189 in boss 184 of the brush assembly. Four bosses 419 (see FIGURES 9 and 11) are provided near the four corners of the backing plate 242 which each have identical adjustment screws 413.

When the carriage is moved to a marginal position such as that illustrated in FIGURE 4, and screw 189 (see FIGURES 5–7) are adjusted to a predetermined distance "X" from the tips of brushes 141, 140 and 143, the adjustment screw 413 in one of the upper bosses 419 on the rear panel is turned to its extreme position, as illustrated in FIGURE 4a so that its reduced diameter end portion fits in the blind bore in surface 191. Screws 154 (see FIGURES 5 and 6) can be loosened so that the entire brush assembly may be shifted laterally in the direction of carriage movement. After screws 154 are tightened, then the lower screw 189 in boss 182 is aligned with the correspondingly positioned adjustment screw 413 in boss 419 by turning set screw 166 at the top of the brush assembly (see FIGURES 5 and 6). This adjustment assures that the brush assembly is vertical.

To adjust the contact pressure on spring contact members 140, screws 82 are loosened and the assembly frame shown in FIGURE 11 is moved toward or away from the spring contact members until the end surface 413[1] (see FIGURE 4a) on adjustment screw 413 abuts surface 191 on screw 189.

Vertical adjustment of the assembly frame shown in FIGURE 11 is effected by loosening screws 75 (see FIGURES 4 and 10) and turning screws 77.

After the foregoing adjustments have been made with the carriage at one marginal position, the carriage is then moved to the other marginal position and the corresponding adjustments are made.

By connecting test voltages to test strips 205 and 207 of the program board of FIGURE 8 and detecting any voltage from the test strips received by test brushes 141 and 143 (see FIGURES 5 and 6), an electrical check of the relative alignment of the program board and brush assembly is provided. No voltage should be detected by test brushes 141 and 143 when the carriage is at either of its marginal positions or at the center position where gaps 209 are provided in test strips 205 and 207. However, the test voltage should be received on both sides of the center carriage position. Once the adjustments are made so that the electrical test indicates proper positioning of the parts, then the system is ready for operation by placing a program card 48 into its proper operating position.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. In a data processing device having a feeding mechanism by which a member is movable in columnar steps to relatively position a record and a recording mechanism; means for interchangeably mounting a selected one of a plurality of interchangeable columnarly perforated program record cards in a fixed position on said device, said record mounting means comprising a generally rectangular pocket open along one edge and having a first centrally open frame side wall and a second opposed parallel wall of non-conductive material having electrical contacts fixed to the surface thereof interiorly of said pocket, and means mounting said walls and selectively operable to effect limited diverging movement thereof to permit insertion of a record card therebetween through said pocket open edge and to effect converging movement thereof to firmly clamp said program record card therebetween; and sensing means operative in synchronism with the columnar stepping movement of said member for successively sensing any indicia recorded in each of the columns of said program record card supported by said interchangeable mounting means.

2. The device defined in claim 1 wherein said first wall is fixed and said second wall is movable toward and from said first wall.

3. The device defined in claim 2 wherein said walls are resiliently biased toward their divergent positions and wherein said mounting and movement effecting means comprises a manually manipulatable operator member and a plurality of pressure applying means operative under control of said operator member to force said second wall toward said first wall in opposition to the resilient biasing force applied thereto.

4. A device defined in claim 3 wherein said operator member comprises a pivotally mounted shaft and wherein said pressure applying means comprises a plurality of cams journalled for pivotal movement about axes fixed relative to said first wall.

5. The device defined in claim 4 wherein said cams each comprise an eccentric and each is pivotable under control of said operator member from an inoperative stop position through a position in which said second wall is forced most closely toward said first wall to a second stop position in which said second wall is slightly less closely spaced from said first wall whereby reverse movement of said cams other than under control of said operator member is precluded, said second stop position of said cams being established by engagement of a first stop member fixed to said operator member with a second stop member fixed relative to said first wall.

6. The device defined in claim 5 further comprising a record card detecting device operable to detect whether a record card is in said pocket and improper orientation of a record card in said pocket, and means responsive to said detecting device for preventing manipulation of said operator member.

7. The device defined in claim 6 wherein said detecting device comprises a pair of record card perforation sensing elements mounted on said pocket in symmetrical relation to the center thereof, one of said elements being operative to be positioned so as to unlock said operator member in the absence of a record card from said pocket and when in alignment with a perforation of a record in said pocket, and the other of said elements being operative to be positioned to unlock said operator member only when aligned with an unperforated portion of a record in said pocket.

8. The device defined in claim 7 wherein said manipulation preventing means comprises a first pair of locking elements mounted for movement into and out of engagement with a second pair of complementary locking elements as determined by the position of said record card perforation sensing elements, said second pair of complementary locking elements being movable into and out of locking engagement with said operator member.

9. In combination with a data processing device having a feeding mechanism by which a member is movable in columnar steps to relatively position a record and a recording mechanism, a perforated record card sensing device comprising means defining a record card sensing station, a record sensing unit mounted for reciprocal movement with said member through a first rectilinear path parallel to the plane of the adjacent face of a record positioned at said record sensing station, said sensing unit having a row of sensing elements thereon, said row extending in a direction parallel to said plane and normal to said path and said sensing elements having perforation sensing portions resiliently biased through said plane, means defining a record card receiving station in which a record card may be deposited in parallel relation to said plane and spaced relation to the ends of said sensing element sensing portions, and selectively operative means for shifting a record card between said receiving station and said sensing station in a direction normal to said plane.

10. In combination with a data processing device having a carriage movable in columnar steps past a fixed printing position, a perforated record card sensing device comprising means defining a record card sensing station, a record sensing unit mountd for reciprocal movement with said carriage through a rectilinear path parallel to the plane of the adjacent face of a record card positioned at said record card sensing station, said sensing unit having a row of sensing elements thereon, said row extending in a direction parallel to said plane and normal to said path and said sensing elements having perforation sensing portions resiliently biased through said plane, means defining a record card receiving station in which a record card may be deposited in parallel relation to said plane and in spaced relation to the ends of said sensing element portions, and selectively operative means for shifting a record card between said receiving station and said sensing station in a direction normal to said plane to place said record card in operative position with the sensing elements on said record sensing unit.

11. In the data processing device defined in claim 10, the improvement wherein said record sensing unit comprises a contact brush assembly mounted on said carriage for reciprocal rectilinear movement therewith in a path adjacent to said plane containing the adjacent face of the record card with brushes thereof biased toward and through said plane to sense the perforations in a perforated record card supported at said sensing station.

12. The device defined in claim 11 wherein the brush assembly comprises a plurality of brushes each consisting of a group of resilient wires fixedly mounted at opposite ends and having a center V portion in contacting relationship with perforations in said record card.

13. The device defined in claim 12 wherein said brush assembly is cantilever supported at one end on said carriage and projects from its support into said path of movement.

14. The device defined in claim 13 wherein the cantilever support for said brush assembly is formed by a first member rigidly fixed to said carriage, a second member rigidly fixed to said brush assembly, said members having engaged planar surfaces lying parallel to said plane, and means pivotally connecting said members about an axis normal to their said planar surfaces to permit pivotal adjustment of said brush assembly relative to said carriage to properly align said brush assembly with said record card.

15. The device defined in claim 11 wherein said brush assembly comprises a shallow channel shaped brush support of non-conductive material having a base wall, spaced parallel side walls and an open side, a cover plate of non-conductive material extending over at least a portion of the open side of said channel shaped brush support and fixed to the side walls thereof at their edges remote from said base wall, said cover plate having a plurality of parallel elongated through apertures extending transversely of and spaced longitudinally of said brush support, and a plurality of plural wire contact brushes, each of said contact brushes extending transversely of said brush support, being supported at its opposite ends upon the brush support side walls and having a V shaped central contact forming portion projecting through one of said cover plate apertures, the portions of said wire contact brushes intermediate their said central portions and the support side walls being normally in spaced relation to both said cover plate and the base wall of said support whereby each contact brush central portion is freely flexibly supported for movement through the associated cover plate aperture in a path normal to the cover plate.

16. The device defined in claim 10 wherein said record sensing unit includes a plate having a plurality of parallel elongated electrical conductors equal in number to the number of sensing elements in said row and extending parallel to the sensing unit path of movement, each of said perforated record sensing elements being adapted to establish electrical contact with the opposed one of said conductors through an aligned aperture of an interposed perforated record, said sensing elements each comprising at least one elongated flexible wire extending substantially parallel to the longitudinal axis of said conductors, each said wire being supported at spaced regions and having flexible unconfined portions of substantially equal length extending in spaced relation to said conductor from said spaced regions toward an intermediate portion whereby said intermediate portion is flexibly mounted for movement relative to said conductor, said intermediate portion having a contact forming tip midway between the adjacent ends of said unconfined portions normally biased toward and, when aligned with a record card aperture, into electrical contact with an opposed one of said conductors, said intermediate portion having cam surfaces at each side of said tip formed symmetrically with respect to said tip whereby said tip, when in contact with said aligned one of said conductors through a perforation in said record, will be cammed from engagement with said conductor by one of said cam surfaces without injury to said sensing element or said record card and whereby said sensing element will slide over the unperforated surface of such a record card in either direction of movement of said sensing element.

17. The device defined in claim 10 wherein each of said sensing elements comprises a low contact pressure contact brush adapted for reciprocal scanning movement relative to a perforated record at said sensing station comprising a group of three parallel identical wires of an equal predetermined length each symmetrical about its longitudinal center and comprising co-linear elongated flexible end regions resiliently supporting and joined by a V shaped perforation sensing intermediate section.

18. The device defined in claim 17 wherein said V shaped section has an apex provided with a curved exterior contact forming surface adapted to slide freely over a perforated record and disposed between similar smooth external camming surfaces adapted to smoothly disengage said apex from engagement with the perforations of such a record.

19. In combination with a data processing machine provided with a carriage mounted for intermittent movement in a plurality of steps between limit positions, an interchangeable program record controlled program unit comprising a program record sensing unit mounted for intermittent movement in a like plurality of steps between limit positions in synchronism with the movement of the carriage and means defining an enclosure for the path of movement of said sensing unit and providing a support to position a selected program record in a position to be sensed by said sensing unit whereby said sensing unit and a record being sensed are protected from injury during operation of said unit.

20. In a perforated record card sensing device, means defining a record card sensing station, a record sensing unit mounted for reciprocal movement through a first rectilinear path parallel to the plane of the adjacent face of a record card positioned at said record card sensing station, said sensing unit having a row of sensing elements thereon, said row extending in a direction parallel to said plane and normal to said path, said sensing elements having perforation sensing portions resiliently biased through said plane, means defining a record card receiving station in which a record card may be deposited in parallel relation to said plane in spaced relation to said sensing element sensing portions, and selectively operative means for shifting a record card between said receiving station and said sensing station in a direction normal to said plane.

21. In combination with a typewriter provided with a carriage mounted for reciprocal movement in a predetermined rectilinear path, a printed circuit board having conductive strips lying in a direction parallel to the path of carriage movement, means for interchangeably supporting a selected perforated record card of insulating material with a surface thereof lying in a plane parallel to the path of carriage movement and in contacting relation with the conductive strips on said printed circuit board, and a perforated record sensing contact brush assembly mounted on said carriage for reciprocal rectilinear movement therewith in a path adjacent said plane with the brushes thereof biased toward and through said plane to sense the perforations in a perforated record so supported by said support means by making contact with the conductive strips on said printed circuit board.

22. The combination as defined in claim 21, wherein said brush assembly is disposed between said plane and the carriage path of movement.

23. The combination as defined in claim 21 wherein said assembly is cantilever supported at one end on said carriage and projects from its support into said path of movement, said cantilever support being formed by a first member rigidly fixed to said carriage, a second member rigidly fixed to said brush assembly, said members having engaged planar surfaces lying parallel to said plane, means pivotally connecting said members about an axis normal to the said planar surfaces to permit pivotal adjustment of said brush assembly relative to said carriage and said supporting means, and selectively actuatable means for clamping said members in rigid assembly.

24. A perforated record sensing contact brush assembly comprising a shallow channel shaped brush support of non-conductive material having a base wall, spaced parallel side walls and an open side, a cover plate of non-conductive material extending over at least a portion of the open side of said brush support and fixed to the side walls thereof at their edges, said cover plate having a plurality of parallel elongated through apertures extending transversely of and spaced longitudinally of said brush support, and a plurality of plural wire contact brush assemblies, each of said contact brush assemblies extending transversely of said brush support, being supported at its opposite ends upon the brush support side walls and having a central V shaped contact forming portion projecting through one of said plate apertures, the portions of said wire contact brush assemblies intermediate their said central portions and the support side walls being normally in spaced relation to both said cover plate and said base wall whereby each brush assembly central portion is freely flexibly supported for movement through the associated cover plate aperture in a path normal to the cover plate.

25. In combination, an elongated electrical conductor, a perforated record sensing element mounted for relative reciprocation movement in a direction longitudinally of said conductor and adapted to establish electrical contact therewith through an aligned aperture of an interposed perforated record, said sensing element comprising an elongated flexible wire extending at least substantially parallel to the longitudinal axis of said conductor, said wire being supported at spaced regions and having flexible unconfined portion of substantially equal length extending in spaced relation to said conductor from said spaced regions toward an intermediate portion whereby said intermediate portion is flexibly mounted for movement relative to said conductor, said intermediate portion having a contact forming tip midway between the adjacent ends of said unconfined portions normally biased toward and, when aligned with a record aperture, into electrical contact with said conductor, said intermediate portion having cam surfaces at each side of said tip formed symmetrically with respect to said tip whereby said tip when in contact with said conductor through a perforation in said record will be cammed from engagement with said conductor by one of said cam surfaces without injury to said element or said record and whereby said element will freely slide over the unperforated surface of such a record in either direction of movement of said sensing element.

26. A low contact pressure contact brush adapted for reciprocal scanning movement relative to a perforated record comprising a plurality of parallel coplanar identical wires of predetermined length each symmetrical about its longitudinal center and comprising colinear elongated flexible end regions resiliently supported and joined by a V shaped perforation sensing intermediate section.

27. The contact brush defined in claim 26 wherein said V shaped section has an apex provided with a curved exterior contact forming surface adapted to slide freely over a perforated record and disposed between similar smooth external camming surfaces adapted to smoothly disengage said apex from engagement with a perforation of a record.

28. A record card support comprising a generally rectangular pocket open along one edge and having a first open frame side wall and a second opposed parallel wall of non-conductive material having at least one electrical contact fixed to the surface thereof interiorly of said pocket, and means mounting said walls and operable to effect limited diverging movement thereof to permit insertion of a record card therebetween through said pocket open edge and to effect converging movement thereof to firmly clamp a record card therebetween.

29. The support defined in claim 28 wherein said first wall is fixed and said second wall is movable toward and from said first wall.

30. The support defined in claim 29 wherein said walls are resiliently biased toward their divergent positions and wherein said mounting and movement effecting means comprises a manually manipulatable operator member and a plurality of spaced pressure applying means operative under control of said operator member to force said second wall toward said first wall in opposition to the resilient biasing force applied thereto.

31. The support defined in claim 30 wherein said operator member comprises a pivotally mounted shaft and said spaced pressure applying means comprises a plurality of cams driven by said pivotally mounted shaft and journalled for concomitant pivotal movement about axes fixed relative to said first wall.

32. The support defined in claim 31 wherein said cams are in the form of an eccentric and each is pivotable under control of said operator member from an inoperative first stop position through an intermediate position in which said second wall is forced most closely toward said first wall to a second stop position in which said second wall is slightly less closely spaced from said first wall, said second stop position of said cam being established by engagement of a first stop member fixed to said operator member with a second stop member fixed relative to said first wall.

33. The support defined in claim 31 together with a record card detecting device operable to detect both the absence of a record card in said pocket and improper orientation of a record card in said pocket, and means responsive to said card detecting device for engaging said operator member shaft to prevent pivotal movement of said shaft.

34. The support defined in claim 33 wherein said detecting device comprises a pair of record card perforation sensing pins having spring biased follower members mounted on said pocket in symmetrical relation to the center thereof, one of said pins being operative to displace its follower member from engaging said operator member shaft in the absence of a record card from said pocket and when in alignment with a perforation of a record card in said pocket and the other of said sensing pins being operative to displace its follower member from engaging said operator member shaft only when aligned with an unperforated portion of a record in said pocket.

35. A spring contact assembly comprising a pair of spaced support members of insulating material mounted in parallel positions, a series of spaced slots along one edge of each support member, and a series of flexible wire brushes mounted with opposite ends of each brush fixed in correspondingly positioned slots on said support members, said brushes lying in parallel planes that are normal to said support members and each having a central V shaped portion with the apex of each V lying in a plane and serving as the electrical contact making portion for each brush.

36. The contact assembly as defined in claim 35 wherein each wire brush is composed of a group of three wires secured in abutting side by side relation.

37. The contact assembly as defined in claim 36 wherein the diameter of each wire is between 5 and 20 mils and the distance between said support members is on the order of two inches to thereby provide controlled brush contact pressure whereby minimum wear and reliable electric contact may be made through perforations in a record card.

38. The contact assembly as defined in claim 36 together with a sheet of insulating material secured to said support members and having a plurality of narrow slotted apertures through which the contact making portions of said brushes extend, said apertures being sufficiently narrow to prevent adjacent brush contact making portions from contacting each other.

39. A method of forming a brush contact assembly having a plurality of contact brushes comprising the steps of providing a pair of rigid support strip members in spaced parallel positions with each of said support members having a series of wire receiving slots extending along the length thereof; cutting contact wires into equal lengths; securing the ends of the wire lengths in the slots on said support members; placing the wires on a die element with the support members on opposite sides thereof; and bending the wires over an edge of said die element to form V shaped contact portions at the center of each wire which, after removal from the die element, lie in a common plane.

40. A method of forming a brush contact assembly containing a plurality of contact brushes comprising the steps of: providing a pair of rigid support strip members in spaced parallel positions with each of said support members having a series of wire receiving slots positioned side by side along the axial length thereof; cutting three pieces of wire of equal length and securing the ends of the three cut wire pieces in side by side relation in a slot in each support member; repeating the cutting and securing step for each of the series of slots in said support members; placing the wire pieces on a die element with the support members on opposite sides thereof; and bending the wires over an edge of said die element to form V shaped contact portions at the center of each wire which, after removal from the die element, lie in a common plane.

41. A program board comprising a layer of insulating material having on a surface thereof a plurality of closely spaced parallel strips of conductive material lying in a field, the width of each of said strips of conductive material and the space between the strips being of uniform size, and first and second test strips of conductive material on opposite sides of said field and being parallel to the plurality of parallel strips, said test strips each having a narrow non-conductive gap with both gaps lying along a straight line that is perpendicular to the longitudinal direction of the parallel strips of conductive materials for insuring proper alignment of the program board.

42. A program board comprising a layer of insulating material having on a surface thereof a plurality of closely spaced parallel strips of conductive material lying in a field, the width of each strip of conductive material and the space between strips being of uniform size, and first and second test strips of conductive material on opposite sides of said field and being parallel to the plurality of said parallel strips, the space between the facing edges of each test strip and the edge of the next adjacent strip in said field being larger than the space between adjacent strips in the field by an amount substantially equal to the width of one conductive strip at positions along end portions of both sides of the field for insuring proper alignment of the program board.

43. The program board as defined in claim 42 wherein the center portions of the test strips are spaced from the next adjacent strip by an amount substantially equal to the space between adjacent strips in said field, said test strips each having a narrow non-conductive gap in their center portions with both gaps lying along a straight line that is perpendicular to the longitudinal direction of the parallel strips of conductive material.

44. A program board as defined in claim 43 together with a contact brush assembly having electrically separate contacts for each of the conductive strips in said field and for said test strips, with uniform spacing between adjacent contacts including contacts for said test strips equal to the spacing between adjacent strips in said field.

References Cited in the file of this patent

UNITED STATES PATENTS

| | | |
|---|---|---|
| 2,424,097 | Johnson | July 15, 1947 |
| 2,501,274 | Hamilton | Mar. 21, 1950 |
| 2,988,193 | D'Onofrio et al. | June 13, 1961 |

UNITED STATES PATENT OFFICE

CERTIFICATE OF CORRECTION

Patent No. 3,072,238                                                         January 8, 1963

Gim P. Chan

It is hereby certified that error appears in the above numbered patent requiring correction and that the said Letters Patent should read as corrected below.

Column 5, lines 52, 57 and 60, for "stroke", each occurrence, read -- strobe --; column 7, line 64, for "mmeber" read -- member --; column 8, line 62, for "brushesh" read -- brushes --; column 13, line 6, for "alinged" read -- aligned --; column 15, line 12, for "screw" read -- screws --; column 17, line 12, for "mountd" read -- mounted --; line 23, after "element" insert -- sensing --.

Signed and sealed this 29th day of October 1963.

(SEAL)
Attest:

ERNEST W. SWIDER                                      EDWIN L. REYNOLDS

Attesting Officer                                        Acting Commissioner of Patents